(12) United States Patent
de Peretti et al.

(10) Patent No.: US 12,271,191 B2
(45) Date of Patent: Apr. 8, 2025

(54) GENERATING AND TRANSMITTING AUTONOMOUS VEHICLE PREPOSITIONING INSTRUCTIONS TO IMPROVE NETWORK COVERAGE

(71) Applicant: Lyft, Inc., San Francisco, CA (US)

(72) Inventors: Renaud Louis Jean-Paul de Peretti, San Francisco, CA (US); Aseem Garg, Belmont, CA (US); Philippe Charles Amilcar Mizrahi, San Francisco, CA (US); Ramon Dario Iglesias, San Francisco, CA (US); Hao Yi Ong, San Francisco, CA (US); Tejinder Singh Aulakh, Indianapolis, IN (US); Timothy Tay Chao, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 354 days.

(21) Appl. No.: 17/805,807

(22) Filed: Jun. 7, 2022

(65) Prior Publication Data
US 2023/0393573 A1 Dec. 7, 2023

(51) Int. Cl.
G05D 1/00 (2024.01)
G06Q 50/40 (2024.01)
G07C 5/00 (2006.01)
G08G 1/127 (2006.01)

(52) U.S. Cl.
CPC ........ G05D 1/0027 (2013.01); G05D 1/0088 (2013.01); G06Q 50/40 (2024.01); G07C 5/008 (2013.01); G08G 1/127 (2013.01)

(58) Field of Classification Search
CPC .... G05D 1/0027; G05D 1/0088; G06Q 50/40; G07C 5/008; G08G 1/127
See application file for complete search history.

(56) References Cited

U.S. PATENT DOCUMENTS

2019/0197798 A1* 6/2019 Abari ..................... G06Q 10/02

* cited by examiner

Primary Examiner — Andrew J Cromer
(74) Attorney, Agent, or Firm — Keller Preece PLLC

(57) ABSTRACT

The present disclosure relates to systems, non-transitory computer-readable media, and methods for generating and transmitting autonomous vehicle prepositioning instructions to improve network coverage. In particular, in one or more embodiments, the disclosed systems subdivide a geographic transportation service area into subregions, generate a set of waypoints and circuits for the subregions. Moreover, in one or more embodiments, the disclosed systems utilize an optimization model to assign autonomous vehicles to the set of waypoints and circuits and transmit digital prepositioning instructions to the autonomous vehicles to traverse the waypoints and circuits.

20 Claims, 11 Drawing Sheets

GENERATING AND TRANSMITTING AUTONOMOUS VEHICLE PREPOSITIONING INSTRUCTIONS TO IMPROVE NETWORK COVERAGE

BACKGROUND

Recent years have seen significant developments in on-demand transportation systems that utilize mobile devices to coordinate across computer networks. Indeed, the proliferation of web and mobile applications has enabled requesting devices to utilize on-demand ride sharing systems to identify matches between provider devices and requester devices and coordinate across computer networks to initiate transportation from one geographic location to another. For instance, conventional transportation network systems can manage pickup, transportation, and drop-off routines through digital transmissions across computer networks. Although conventional transportation matching systems can match requesting computing devices with provider computing devices, conventional systems often face a number of technical problems, particularly with respect to flexibility of operation and efficiency of implementing computing devices.

BRIEF SUMMARY

One or more embodiments of the present disclosure provide benefits and/or solve one or more of the foregoing or other problems in the art with systems, methods, and non-transitory computer-readable storage media that dynamically generate and modify autonomous vehicle pre-matching circuits defined by autonomous vehicle waypoints and transmit autonomous vehicle prepositioning instructions utilizing autonomous vehicle waypoints to improve overall network coverage. In particular, in some embodiments the disclosed systems utilize a computer-implemented prediction model to determine predicted autonomous vehicle requester devices. The disclosed systems utilize the predicted autonomous vehicle requester devices to divide a service area into subregions and select waypoints defining autonomous vehicle pre-matching circuits within the subregions. Moreover, in one or more embodiments, the disclosed systems monitor contextual device information to dynamically modify waypoints and autonomous vehicle pre-matching circuits to respond to changing conditions. In addition, in one or more implementations the disclosed systems utilize computer-implemented optimization models to generate changing autonomous vehicle prepositioning assignments to subregions, circuits, and/or waypoints over time based on current autonomous vehicle locations and/or predicted autonomous vehicle requester devices. For example, the disclosed systems direct one or more autonomous vehicles to traverse a circuit within a subregion defined by the waypoints within the circuit. Additionally, the disclosed systems can transmit additional prepositioning instructions to move between subregions, traverse a different circuit, and or modify a current waypoint within a circuit. In this manner, the disclosed systems can improve efficiency, network coverage, and/or flexibility of a transportation matching system, for example, by dynamically adapting the response of the system based on changing vehicle states and predicted transportation requests.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
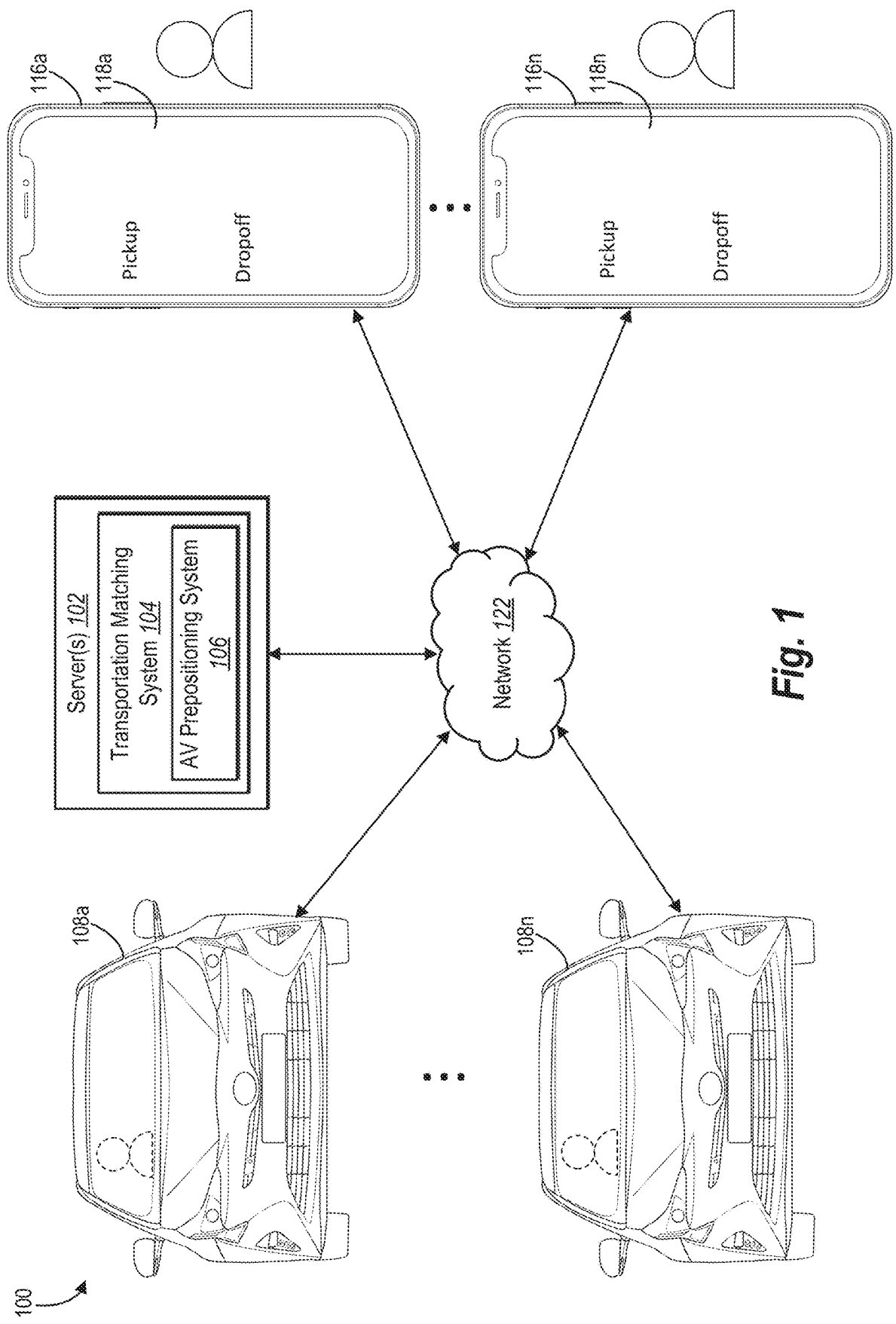
FIG. 1 illustrates a diagram of an environment in which an autonomous vehicle prepositioning system can operate in accordance with one or more embodiments.

This disclosure describes one or more embodiments of an autonomous vehicle (AV) prepositioning system that utilizes computer-implemented models to generate and transmit autonomous vehicle prepositioning instructions to autonomous vehicles to improve network coverage. For example, in one or more implementations the AV prepositioning system determines waypoints and autonomous vehicle pre-matching circuits within subregions of a transportation service area and intelligently assigns autonomous vehicles to travel along circuits within selected subregions. In particular, the AV prepositioning system uses real-time location and state information of autonomous vehicles in a vehicle fleet along with predicted requests from requester devices to transmit prepositioning instructions to autonomous vehicles that efficiently distribute the autonomous vehicles to improve network coverage. For example, the AV prepositioning system utilizes a computer-implemented prediction model to determine predicted requests from requester devices and divide a transportation service area into multiple subregions based on the predicted requests. Within the subregions, the AV prepositioning system generates waypoints and autonomous vehicle pre-matching circuits and dynamically modifies these waypoints and circuits over time to respond to changes in real time circumstances. In one or more embodiments, the AV prepositioning system assigns an autonomous vehicle to traverse a circuit until the AV prepositioning system generates modified autonomous prepositioning instructions or matches the autonomous vehicle with one or more requester devices.

As just mentioned, in one or more embodiments the AV prepositioning system divides a transportation service area into autonomous vehicle subregions with autonomous vehicle waypoints. For example, the AV prepositioning system analyzes a service area to identify autonomous vehicle accessibility locations within the service area and/or locations where autonomous vehicles are not permitted. Moreover, the AV prepositioning system utilizes a prediction model (e.g., a machine learning model or statistical model) to analyze historical data and/or current conditions to generate predicted requester devices within the service area. In one or more implementations, the AV prepositioning system selects subregions based on the predicted requester devices and/or the autonomous vehicle accessibility locations.

In addition, as mentioned above, the AV prepositioning system also determines waypoints within the subregions. The AV prepositioning system can determine waypoints based on a variety of features. For example, in some implementations, the AV prepositioning system generates waypoints within a subregion based on autonomous vehicle accessibility locations within the subregion and/or predicted requester devices in the subregion. For example, the AV prepositioning system can select waypoints based on distances between the waypoints to predicted autonomous vehicle requester device locations. Similarly, the AV prepositioning system can select waypoints that allow autonomous vehicles to avoid impermissible autonomous vehicle maneuvers (e.g., parking or remaining in a region without a passenger). The AV prepositioning system can also select and/or modify waypoints based on detecting and monitoring a variety of real-time signals, such as traffic or weather changes.

In one or more implementations, the AV prepositioning system determines circuits defined by the waypoints within a subregion. To illustrate, the AV prepositioning system generates a circuit that includes a first leg from a first waypoint to a second waypoint and a second leg from a second waypoint to a first waypoint. The AV prepositioning system can generate a circuit between two or more waypoints. Moreover, in one or more embodiments, the AV prepositioning system dynamically modifies waypoints and/or circuits (e.g., to avoid repetitive traversal of the same route or areas within a subregion and/or to respond to varying conditions).

The AV prepositioning system also evaluates a fleet of autonomous vehicles and determines autonomous vehicle subregion assignments. For example, the AV prepositioning system determines a subregion, a circuit within a subregion, and a particular waypoint for individual autonomous vehicles. The AV prepositioning system generates autonomous vehicle subregion assignments based on a variety of factors. For example, in some embodiments, the AV prepositioning system monitors and evaluates locations of one or more autonomous vehicles, as well as their states. The AV prepositioning system generates autonomous vehicle subregion assignments based on these locations/states, predicted autonomous vehicle requester devices, battery levels, and/or distances to waypoints/subregions.

To illustrate, in some embodiments, the AV prepositioning system utilizes an optimization model for reducing system costs to generate autonomous vehicle subregion assignments. In particular, the AV prepositioning system can utilize a variety of computer implemented models that balance system costs associated with failure to respond to predicted autonomous vehicle requester devices and/or prepositioning costs to generate autonomous vehicle subregion assignments. By utilizing an optimization model, the AV prepositioning system can generate autonomous vehicle subregion assignments that efficiently locate autonomous vehicles to improve network coverage, reduce latency in responding to requests, and improve overall utilization of autonomous vehicles.

As mentioned, the AV prepositioning system may also transmit digital prepositioning instructions to a set of autonomous vehicles. The set of autonomous vehicles may include all or a subset of the autonomous vehicles of the vehicle fleet. The digital prepositioning instructions may direct the autonomous vehicles of the set to travel to particular waypoints corresponding to particular circuits within the subregions. The AV prepositioning system may also send digital prepositioning instructions to autonomous vehicles that direct the autonomous vehicles to change the subregion and/or the circuit along which the one or more autonomous vehicles are traveling.

In one or more embodiments, the AV prepositioning system also dynamically modifies waypoints, circuits, autonomous vehicle assignments, and/or digital prepositioning instructions. For example, the AV prepositioning system 106 determines changes in predicted autonomous vehicle requester devices and monitors locations of autonomous vehicles as they traverse circuits within subregions. The AV prepositioning system 106 can generate a new set of autonomous vehicle waypoints defining a new set of autonomous vehicle pre-matching circuits. Moreover, the AV prepositioning system 106 can utilize an optimization model to generate autonomous vehicle assignments for the new set of waypoints and circuits. In this manner, the AV prepositioning system dynamically transmits digital prepositioning instructions to autonomous vehicles to respond to changing conditions and improve overall network coverage within a transportation area.

Upon identifying a transportation request, in one or more embodiments the AV prepositioning system also generates a transportation match with a provider vehicle, such as one of the autonomous vehicles. Indeed, as mentioned, the AV prepositioning system can generate autonomous vehicle assignments and transmit digital prepositioning instructions utilizing an optimization model to reduce system costs, improve network coverage, and allow autonomous vehicles and the transportation matching system to more efficiently respond to autonomous vehicle transportation requests. Accordingly, in response to receiving an autonomous vehicle transportation request, the AV prepositioning system can generate a transportation match between a requester device and autonomous vehicle and transmit digital instructions directing the autonomous vehicle to the requester device.

As mentioned above, although conventional transportation matching systems can match requesting computing devices with provider computing devices, conventional systems often face a number of technical problems, particularly with respect to efficiency and flexibility of implementing computing devices. For example, conventional systems often suffer from system inefficiencies as a result of computing device imbalances and ineffective network coverage. To illustrate, conventional systems often leave autonomous vehicles within waiting locations and/or roaming across designated locations within large metropolitan regions. This approach often results in an imbalance between provider devices and requester devices across transportation regions which leads to increased latency, reduced responsiveness, reduced bandwidth, and inefficient utilization of computer resources. For example, such poor network coverage results in increased network traffic with requester devices, increased queries and digital navigation instructions to autonomous vehicles, increased cancellations from requester devices, and an overall increase in duplicative queries and bandwidth utilization between requester devices, provider devices, and servers. Furthermore, such poor network coverage results in significant computational resources for onboard computing systems to navigate autonomous vehicles in responding to requester devices. Accordingly, such device imbalances and poor network coverage significantly undermine the operational efficiency of implementing computing devices.

In addition, conventional systems are also rigid and inflexible. Indeed, as discussed above, conventional systems generally provide limited functionality prior to initiating a transportation match with autonomous vehicles. Typically, such systems leave autonomous vehicles in designated waiting locations (e.g., staging lots) or generally roaming to rigid locations within a region until identifying a transportation match. Part of the reason for this rigid approach is the nature of autonomous vehicles. Indeed, autonomous vehicles often have particular maneuvers that they are unable or prohibited from performing (e.g., parking and stopping on city roads or at airport terminals). Thus, conventional systems avoid this concern by leaving autonomous vehicles inactive (e.g., in a staging lot) or driving within a large unrestricted area that can avoid these maneuvers.

Some systems seek to avoid these problems by using drivers that interact with provider mobile devices rather than utilizing autonomous vehicles. However, this approach creates its own technical problems. Indeed, provider mobile devices often undermine network coverage in that they repeatedly (and often erratically) switch between online and offline modes over time. Accordingly, conventional systems that utilize provider devices also create device imbalances and inefficiencies discussed above as provider mobile devices navigate away from a particular mobile app and create holes within the network.

The disclosed AV prepositioning systems provide many advantages and benefits over conventional transportation matching systems and methods. For example, in some embodiments, the disclosed systems enhance operational efficiency and flexibility relative to conventional systems. To illustrate, by intelligently dividing a transportation service area into subregions, generating circuits defined by waypoints, and generating autonomous vehicle subregion assignments, the AV prepositioning system can significantly improve network coverage and reduce device imbalances. Indeed, as described above, in one or more implementations the AV prepositioning system utilizes a prediction model to determine predicted requester devices within various subregions. In one or more implementations, the AV prepositioning system utilizes this information to intelligently generate subregions and autonomous vehicle subregion assignments that reduce imbalances between provider devices and requester devices, reduce requester device transmissions, reduce navigation instructions, reduce digital cancellation traffic and duplicative requests, improve bandwidth, and reduce latency. Accordingly, in one or more embodiments the AV prepositioning system improves system performance and reduces utilization of computing resources.

In addition, the AV prepositioning system also improves computer functionality and flexibility. Indeed, the AV prepositioning system generates more flexible, accurate prepositioning instructions that cause autonomous vehicles to navigate circuits within subregions prior to receiving a transportation request. Moreover, the AV prepositioning system 106 dynamically modifies waypoints and/or circuits to respond to changing features in real time. This flexible approach avoids rigid staging lots and provides a more efficient web of autonomous vehicles that contribute to the efficiency improvements discussed above. Furthermore, in one or more embodiments the AV prepositioning system accounts for any prohibited maneuvers or areas corresponding to autonomous vehicles in generating waypoints and circuits (and dynamically utilizes a threshold radius to redirect autonomous vehicles) to flexibly preposition autonomous vehicles relative to the location of anticipated requester devices. Thus, the AV prepositioning system provides improved functionality for autonomous vehicles and other implementing computer devices.

In addition, the AV prepositioning system also provides improved functionality relative to systems that utilize providers and corresponding provider mobile devices. For instance, by utilizing computer-implemented models to generate prepositioning instructions for autonomous vehicles, the disclosed systems can more accurately and reliably improve network coverage. Indeed, the AV prepositioning system can dynamically monitor battery life or other features that might disrupt autonomous vehicles and incorporate these features into models for generating prepositioning instructions. Thus, the AV prepositioning systems can avoid unanticipated device disruptions and network coverage holes that plague conventional systems relying on provider mobile devices that routinely alternate between online and offline modes. Indeed, in one or more embodiments, the AV prepositioning system 106 transmits an initial waypoint and a fallback waypoint. Thus, even if computer network disruptions occur, autonomous vehicles have multiple waypoints to traverse within a circuit to remain efficiently positioned within a transportation service area.

As illustrated by the foregoing discussion, the present disclosure utilizes a variety of terms to describe features and advantages of the AV prepositioning system. Additional detail is now provided regarding the meaning of such terms. For example, as used herein, the term "autonomous vehicle" refers to a vehicle that operates (e.g., drives or maneuvers) with little or no human input (e.g., without a driver in the vehicle). In particular, the term "autonomous vehicle" can include ground automobiles that incorporate vehicular automation to move about a transportation grid. To illustrate, an autonomous vehicle can include self-driving cars and other self-driving automobiles.

As used herein, the term "transportation service area" refers to a geographic region for providing transportation services. In particular, the term "transportation service area" can include a municipality in which transportation needs may be fulfilled by a ground vehicle. To illustrate, a transportation service area can include a city, a town, a portion of a city or a town, a greater metropolitan area comprising multiple cities, or even a rural community.

As used herein, the term "autonomous vehicle subregion" refers to a subdivision of a transportation service area. In particular, the term "autonomous vehicle subregion" can include a subdivision of a transportation service area within which an autonomous vehicle provides transportation services. To illustrate, an autonomous vehicle subregion can include a neighborhood, a geohash, and an area defined by coordinates or landmarks.

As used herein, the term "autonomous vehicle waypoint" refers to a location, coordinate, or landmark that serves as a target destination for an autonomous vehicle. In particular, the term "autonomous vehicle waypoint" can include a destination or a milestone toward which an autonomous vehicle moves while waiting to be matched with a requester device. To illustrate, an autonomous vehicle waypoint can include a latitude-longitude coordinate, a manmade landmark, and a natural landmark. In some examples, the autonomous vehicle waypoint may correspond to a pickup location or a drop-off location for a passenger.

As used herein, the term "requester device" refers to a device (corresponding to a requester) that submits a request for transportation services. In particular, the term "requester device" can include a computing device that places a query identifying a need for transportation from a geographic location to another geographic location. To illustrate, a requester device can include a mobile phone, a tablet, and a computer, any of which may place a request utilizing a mobile application or a web-based application.

As used herein, the term "predicted autonomous vehicle requester device" refers to an expected instance of a requester device placing a transportation request (for an autonomous vehicle). In particular, the term "predicted autonomous vehicle requester device" can include a prediction of when and where a requester will make a transportation request. To illustrate, a predicted autonomous vehicle requester device can include a location and/or time that a requester device will transmit a query for a transportation service via an autonomous vehicle.

As used herein, the term "predicted autonomous vehicle request" refers to an expected instance of a query for transportation services (e.g., transportation services from an autonomous vehicle). In particular, the term "predicted autonomous vehicle request" can include a prediction of when and where a transportation request for an autonomous vehicle will occur. To illustrate, a predicted autonomous vehicle request can include a location and/or time of a request for a transportation service.

As used herein, the term "digital prepositioning instructions" refers to directions transmitted to a vehicle prior to receiving a transportation match (e.g., to move to a location or to remain in place). In particular, the term "digital prepositioning instructions" can include instructions that an autonomous vehicle travel to a certain location or along a certain route. To illustrate, digital prepositioning instructions can include instructions that an autonomous vehicle travel towards an autonomous vehicle waypoint, redirect itself away from an autonomous vehicle waypoint to a subsequent autonomous vehicle waypoint, reposition itself into a different subregion, and/or reposition itself onto a different circuit.

As used herein, the term "autonomous vehicle pre-matching circuit" (or "circuit") refers to a collection of waypoints within a subregion. An autonomous vehicle may traverse an autonomous vehicle pre-matching circuit while waiting to be matched with a requester device for a transportation. In particular, the term "circuit" can include a first autonomous vehicle waypoint and a second autonomous vehicle waypoint indicating paths for an autonomous vehicle to travel prior to a transportation match between the autonomous vehicle and a requester device. The circuit may further include a third or more autonomous vehicle waypoints. The circuit may include a series of waypoints that form a closed-loop, returning to the first autonomous vehicle waypoint after the last autonomous vehicle waypoint. To illustrate, in one or more embodiments, the AV prepositioning system 106 generates a circuit defined by two or more autonomous vehicle waypoints. The AV prepositioning system 106 provides one or more of these waypoints to an autonomous vehicle. The autonomous vehicle can determine a route to travel to the waypoints within the circuit. In some examples, the circuit may correspond to one or more roads that the autonomous vehicle is authorized to traverse on based upon the locations of the waypoints in the subregion.

As used herein, the term "autonomous vehicle accessibility location" refers to a location at which an autonomous vehicle can maneuver and at which the autonomous vehicle is permitted to operate. In particular, the term "autonomous vehicle accessibility location" can include a road, street, highway, parkway, or other infrastructure on which an autonomous vehicle is allowed to (or able to) travel.

As used herein, the term "autonomous vehicle prediction model" (or "prediction model") refers to a computer model used to determine predicted autonomous vehicle requests or predicted autonomous vehicle requester devices. In particular, the term "autonomous vehicle prediction model" can include a subroutine or function that reports expected autonomous vehicle requests for a particular geographic area and time. To illustrate, an autonomous vehicle prediction model can include a machine learning model that uses historical requester device vehicle requests to give spatial and temporal predictions for autonomous vehicle requests.

As used herein, the term "optimization model" refers to a computer-implemented model for determining a set of variables or features that will improve another variable or feature. For example, an optimization model can include an objective function, heuristic model, or machine learning model that generates suggested variables or features to reduce a system cost. To illustrate, an optimization model can balance various system costs to generate suggested autonomous vehicle assignments.

As used herein, the term "system cost" refers to a metric, value, or measure reflecting a cost to a transportation matching system. For example, a system cost can include computational resources of an autonomous vehicle, increased time or latency in responding to a requester device, decreased utilization of autonomous vehicles, or energy costs (e.g., increased time or vehicle resources utilized to travel an excess distance). Thus, a system cost can include costs associated with failing to respond to a predicted autonomous vehicle requester device (e.g., lost value of providing transportation services and/or increased computing resources associated with repeated queries from the requester device) or costs associated with modifying locations of autonomous vehicles (e.g., time and travel costs and/or computing resources to navigate the autonomous vehicle to a new location). In one or more embodiments, an optimization model balances these system costs to generate autonomous vehicle assignments (e.g., an assignment of an autonomous vehicle to a subregion, route, and/or waypoint).

As used herein, the term "historical requester device vehicle request" refers to a transportation request that a transportation matching system has received in the past. In particular, the term "historical requester device vehicle request" can include knowledge of prior autonomous vehicle requests that an AV prepositioning system has received and handled. To illustrate, a historical requester device vehicle request can include a list or database of prior autonomous vehicle requests for a certain geographic area over a period of time.

As used herein, the term "transportation match" (or "match") refers to transportation request that a transportation matching system has assigned to a particular provider. In particular, the transportation matching system generates a match that assigns an autonomous vehicle from a vehicle fleet to a transportation request that includes a requestor, a pickup location, and a drop-off location. The transportation matching system can provide a route to the autonomous vehicle that includes navigation instructions from the current location of the autonomous vehicle to the pickup location specified by the transportation match.

Turning now to the figures, FIG. 1 illustrates a schematic diagram of an environment 100 for implementing an AV prepositioning system 106 in accordance with one or more embodiments. As shown in FIG. 1, the environment 100 includes server(s) 102 comprising a transportation matching system 104 and the AV prepositioning system 106, autonomous vehicles 108a-108n, requester client devices 116a-116n (respectively corresponding to individual requesters), and a network 122.

As shown, in one or more embodiments, the AV prepositioning system 106 can be a component of the transportation matching system 104 implemented on one or more of the server(s) 102. In these or other embodiments, the AV prepositioning system 106 may perform one or more acts of the present disclosure described in conjunction with the transportation matching system 104. Additionally, or alternatively, the transportation matching system 104 may perform one or more acts of the present disclosure described in conjunction with the AV prepositioning system 106. Furthermore, although FIG. 1 depicts the AV prepositioning system 106 and the transportation matching system 104 as distinct systems, the AV prepositioning system 106 can be implemented in whole or in part by the transportation matching system 104, and vice-versa. Similarly, in one or more embodiments, the transportation matching system 104 includes an (autonomous vehicle) fleet matching system that matches a fleet of vehicles (autonomous or driver vehicles) to corresponding requester devices.

As indicated by FIG. 1, the transportation matching system 104 uses the server(s) 102 to communicate with the autonomous vehicles 108a-108n (and/or other provider devices, such as provider mobile devices associated with drivers) and the requester client devices 116a-116n via the network 122. For example, the transportation matching system 104 communicates with the autonomous vehicles 108a-108n and the requester client devices 116a-116n via the network 122 to determine locations of the autonomous vehicles 108a-108n and the requester client devices 116a-116n, respectively. Per device settings, for instance, the transportation matching system 104 may receive location coordinates from the autonomous vehicles 108a-108n and/or the requester client devices 116a-116n, respectively. For example, the AV prepositioning system 106 can detect that an autonomous vehicle (e.g., the autonomous vehicle 108a) is near or has arrived at a pickup location associated with a transportation request that has been matched to the autonomous vehicle based on one or more of GPS information associated with the autonomous vehicle, WiFi information associated with the autonomous vehicle, Near-Field Communication (NFC) information associated with the autonomous vehicle, or a communication from the autonomous vehicle indicating the current location of the autonomous vehicle. Based on the location coordinates and other considerations, the transportation matching system 104 matches or assigns the autonomous vehicle 108a with one or more of the requester client devices 116a-116n for transportation.

As suggested above, each of the requester client devices 116a-116n may comprise a mobile device, such as a laptop, smartphone, or tablet associated with a requester. Each of the autonomous vehicles 108a-108n may comprise a computing device such as a processing device built into the autonomous vehicle to assist in determining location information and/or in navigating the autonomous vehicles 108a-108n. For example, the autonomous vehicles 108a-108n can include a processing device under (or within) the dashboard of a vehicle that includes a display screen to illustrate navigation instructions or other transportation information (e.g., destination location, pickup location, cost, etc.). The computing devices of the autonomous vehicles 108a-108n and the requester client devices 116a-116n may include a variety of types of computing device as further explained below with reference to FIG. 10.

As further indicated by FIG. 1, the requester client devices 116a-116n include requester applications 118a-118n. In some embodiments, the requester applications 118a-118n comprise web browsers, applets, or other software applications (e.g., native applications) available to the requester client devices 116a-116n. Additionally, in some instances, the transportation matching system 104 provides data including instructions that, when executed by the autonomous vehicles 108a-108n or by the requester client devices 116a-116n, respectively create or otherwise integrate one of the autonomous vehicles 108a-108n or the requester applications 118a-118n with an application or webpage.

As further depicted in FIG. 1, the transportation matching system 104 sends route guidance and/or other notifications to the autonomous vehicles 108a-108n. While FIG. 1 depicts the autonomous vehicles 108a-108n as automobiles, an autonomous vehicle may also be an airplane, bicycle, motorcycle, scooter, or other vehicle. In some cases, this disclosure describes an autonomous vehicle as performing certain functions, but such an autonomous vehicle includes an associated computing device that often performs a corresponding function. For example, when the transportation matching system 104 sends a transportation match to the autonomous vehicle 108a—or queries location information from the autonomous vehicle 108a—the transportation matching system 104 sends the transportation match or location query to the computing device of the autonomous vehicle 108a. Accordingly, the autonomous vehicle 108a and its computing device are part of a vehicle subsystem.

Although not illustrated in FIG. 1, in some embodiments, the environment 100 may have a different arrangement of components and/or may have a different number or set of components altogether. As an example, in some embodiments, the autonomous vehicles 108a-108n include hybrid self-driving vehicles with both self-driving functionality and some human operator interaction.

Whether the autonomous vehicle is a fully autonomous vehicle or a hybrid self-driving vehicle, the autonomous vehicle may include additional components not depicted in FIG. 1. Such components may include location components, one or more sensors by which the autonomous vehicle navigates, and/or other components necessary to navigate without an operator (or with minimal interactions with an operator). Regardless of whether an autonomous vehicle is associated with an operator, an autonomous vehicle optionally includes a locator device, such as a GPS device, that determines the location of the autonomous vehicle within one or more of the autonomous vehicles 108a-108n.

As mentioned above, the autonomous vehicles 108a-108n, respectively include a computing device and/or vehicle computing system separate from or integral to the autonomous vehicles 108a-108n, respectively. Regardless of its form, the computing device may include various sensors, such as a GPS locator, an inertial measurement unit, an accelerometer, a gyroscope, a magnetometer, and/or other sensors, from which the transportation matching system 104 can access information, such as location information.

In some embodiments, the transportation matching system 104 communicates with the autonomous vehicles 108a-108n through an application. For instance, the application can cause the autonomous vehicles 108a-108n, respectively to communicate with the transportation matching system 104 to navigate to a pickup location to pick up a requester; navigate to a pickup location to pick up a shared requester; navigate to a drop-off location; identify a change in drop-off location, route, or waypoint; and/or collect fares. In some cases, the application causes the autonomous vehicles 108a-108n to communicate with the transportation matching system 104 to receive and present an altered or adjusted route to include pickup and drop-off locations of a new requester, as described further below.

As mentioned above, in one or more embodiments the AV prepositioning system 106 divides a transportation service area into subregions, intelligently generates waypoints and corresponding autonomous vehicle pre-matching circuits for autonomous vehicles, and generates autonomous vehicle subregion assignments. Indeed, the AV prepositioning system 106 can intelligently balance autonomous vehicle supply and requester device demand in assigning autonomous vehicles to subregions, circuits, and waypoints. For example, FIGS. 2A-2B illustrate the AV prepositioning system 106 dynamically determining autonomous vehicle subregion assignments and transmitting digital prepositioning instructions in accordance with one or more embodiments.

Figure 2A:
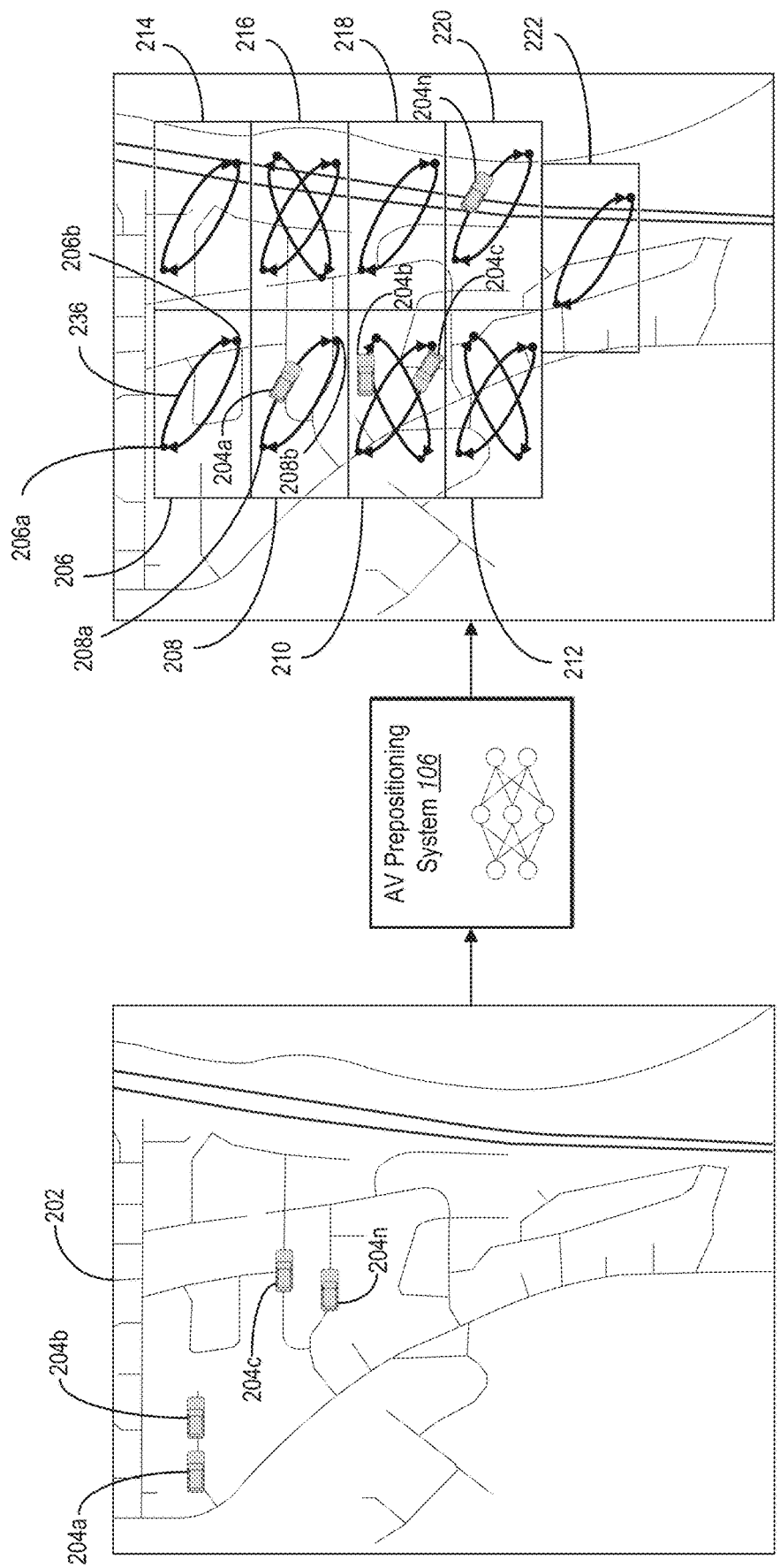
FIGS. 2A-2B illustrate an overview of dividing a transportation service area into subregions, determining circuits defined by waypoints, and generating autonomous vehicle assignments in accordance with one or more embodiments.
Figure 2B:
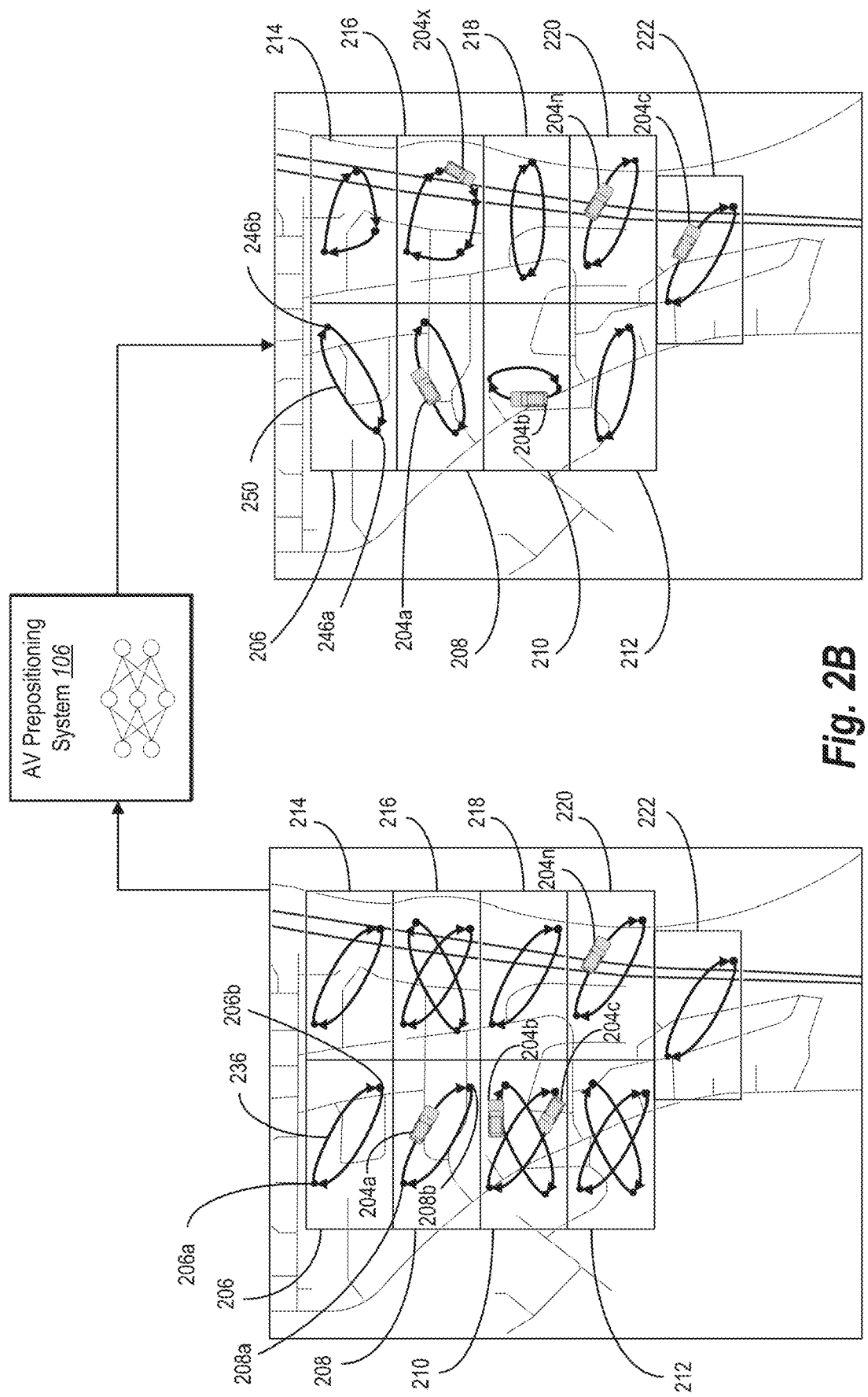

In particular, FIG. 2A illustrates a transportation service area 202 with a plurality of autonomous vehicles 204a-204n belonging to a vehicle fleet within the transportation service area 202. As illustrated, the AV prepositioning system 106 analyzes the transportation service area 202 and divides the transportation area into a plurality of subregions 206-222. In particular, the AV prepositioning system 106 utilizes a prediction model to determine predicted numbers and/or locations of autonomous vehicle requester devices. Moreover, the AV prepositioning system 106 utilizes the predicted numbers and/or locations of requester devices to generate the plurality of subregions 206-222. Additional detail regarding the AV prepositioning system 106 dividing a transportation into a plurality of subregions is provided below (e.g., in relation to FIG. 3).

As illustrated in FIG. 2A, in addition to generating the subregions 206-222 the AV prepositioning system 106 also generates a first set of waypoints for the subregions 206-222. For example, the AV prepositioning system 106 generates the waypoints 206a-206b for the first subregion 206. As illustrated, the waypoints 206a-206b comprise locations within the subregion 206. Similarly, the AV prepositioning system 106 generates the waypoints 208a-208b for the second subregion 208 and generates the waypoints 210a-210d for the third subregion 210.

Specifically, the AV prepositioning system 106 generates these waypoints to efficiently preposition the autonomous vehicles 204a-204n within the subregions. Thus, for example, the AV prepositioning system 106 determines the waypoints 206a-206b based on a predicted number and/or location of autonomous vehicle requester devices within the subregion 206. Moreover, the AV prepositioning system 106 determines the waypoints 206a-206b based on autonomous vehicle accessibility locations within the subregion 206. The AV prepositioning system 106 can dynamically modify the waypoints 206a-206b over time to accommodate real-time changes and/or to vary autonomous vehicle routes within the subregion 206. Additional detail regarding the AV prepositioning system 106 generating waypoints for subregions is provided below (e.g., in relation to FIG. 3).

Moreover, as shown in FIG. 2A, the AV prepositioning system 106 determines autonomous vehicle pre-matching circuits corresponding to the waypoints. In particular, the AV prepositioning system 106 determines autonomous vehicle pre-matching circuits that comprise legs defined by the waypoints within each subregion. For example, the AV prepositioning system 106 determines a first circuit 236 within the subregion 206 based on the waypoints 206a-206b. The first circuit 236 includes the waypoint 206a and the waypoint 206b. In particular, the first circuit 236 includes a first leg from the waypoint 206a to the waypoint 206b. In addition, the first circuit 236 includes a second leg from the waypoint 206b to the waypoint 206a. Additional detail regarding determining such circuits is provided below (e.g., in relation to FIG. 3).

Further, as shown in FIG. 2A, the AV prepositioning system 106 also generates autonomous vehicle subregion assignments for the autonomous vehicles 204a-204n and transmits digital prepositioning instructions to improve network coverage for the transportation service area 202. In particular, the AV prepositioning system 106 assigns the autonomous vehicles 204a-204n to particular subregions, autonomous vehicle pre-matching circuits, and/or waypoints. For example, in one or more embodiments, the AV prepositioning system 106 utilizes an optimization model that generates autonomous vehicle prepositioning assignments based on system costs (e.g., to reduce, minimize, or optimize system costs). In one or more embodiments, the AV prepositioning system 106 determines these system costs utilizing the locations of the autonomous vehicles 204a-204n, predicted autonomous vehicle requester devices, and/or distances between the autonomous vehicles 204a-204n and waypoints within the subregions. Indeed, as shown, the AV prepositioning system 106 transmits digital prepositioning instructions to efficiently distribute the autonomous vehicles 204a-204n across the transportation service area 202 to traverse particular autonomous vehicle pre-matching circuits until determining transportation matches between autonomous vehicles and corresponding requester devices.

Specifically, in one or more embodiments, the AV prepositioning system 106 transmits digital prepositioning instructions by transmitting individual assigned waypoints to individual autonomous vehicles. Indeed, the AV prepositioning system 106 can efficiently transmit digital prepositioning instructions by transmitting a coordinate or location for an individual waypoint (e.g., rather than a specific transportation route). In one or more implementations, the AV prepositioning system 106 provides a waypoint and a fallback waypoint in the event that the autonomous vehicle losses connectivity. In some implementations, the AV prepositioning system 106 transmits additional waypoints as autonomous vehicles traverse through the circuit (e.g., as an autonomous vehicle completes a leg and approaches a waypoint).

For example, as shown, the autonomous vehicle 204a travels towards a first autonomous vehicle waypoint 208a. When the AV prepositioning system 106 determines that the autonomous vehicle 204a reaches the first autonomous vehicle waypoint 208a (or determines that the autonomous vehicle 204a arrives within a predefined threshold radius of the first autonomous vehicle waypoint 208a), the AV prepositioning system 106 transmits additional instructions to direct the autonomous vehicle 204a towards the second autonomous vehicle waypoint 208b. In similar fashion, when the AV prepositioning system 106 determines that the autonomous vehicle 204a reaches the second autonomous vehicle waypoint 208b (or determines that the autonomous vehicle 204a arrives within a predefined threshold radius of the second autonomous vehicle waypoint 208b), the AV prepositioning system 106 directs the autonomous vehicle towards the autonomous vehicle waypoint 208a (or a third autonomous vehicle waypoint if the circuit includes additional waypoints).

Moreover, as shown in FIG. 2B, the AV prepositioning system 106 also dynamically modifies waypoints, autonomous vehicle pre-matching circuits, autonomous vehicle assignments, and/or digital prepositioning instructions over time. For example, as shown, the AV prepositioning system 106 determines a second set of waypoints and a second set of circuits for the subregions 206-222. To illustrate, the AV prepositioning system 106 monitors changing conditions within the transportation area, such as changing traffic patterns, changing weather, etc. Moreover, the AV prepositioning system 106 utilizes a prediction model to determine additional predicted autonomous vehicle requester devices. Further the AV prepositioning system 106 monitors real-time locations of the autonomous vehicles 204a-204n. The AV prepositioning system 106 utilizes this information to determine new waypoints defining new autonomous vehicle pre-matching circuits.

For example, in one or more embodiments, the AV prepositioning system 106 determines new waypoints 246a-246b within the subregion 206. In particular, the AV prepositioning system 106 selects the new waypoints 246a-246b based on an additional prediction of autonomous vehicle requester devices (and autonomous vehicle requester device locations). For example, the AV prepositioning system 106 determines a change in autonomous vehicle requester device locations and selects the new waypoints 246a-246b such that a new circuit 246 defined by the new waypoints 246a-246b will place an autonomous vehicle within a close proximity to the autonomous vehicle requester device locations. Indeed, in one or more embodiments, the AV prepositioning system 106 selects waypoints by reducing (e.g., minimizing) a distance (e.g., average distance) between an autonomous vehicle pre-matching circuit and predicted autonomous vehicle requester device locations within a subregion. As discussed above, the AV prepositioning system 106 can determine the second set of waypoints utilizing a variety of features or factors. Including additional predicted autonomous vehicle requester devices, locations of predicted autonomous vehicle requester devices, traffic conditions, weather conditions, updated autonomous vehicle locations, etc.

As illustrated, the AV prepositioning system 106 can determine a variety of different waypoints. For example, the AV prepositioning system 106 can change the number, order, or sequence of waypoints within a subregion (e.g., move from two waypoints to three or four waypoints). Similarly, the AV prepositioning system 106 can change the number of circuits within a subregion (e.g., from two circuits to one circuit or from one circuit to two circuits).

Furthermore, as shown, the AV prepositioning system 106 can generate new autonomous vehicle assignments. Indeed, the AV prepositioning system 106 can utilize the optimization model to assign autonomous vehicles to different subregions, different circuits, and/or different waypoints. In this manner, the AV prepositioning system 106 can respond to changing conditions over time. Moreover, the AV prepositioning system 106 can vary routes travelled by autonomous vehicles (e.g., to avoid excess travel within a particular region, neighborhood, or location). For example, the AV prepositioning system 106 can generate modified autonomous vehicle assignments (and/or determine modified waypoints or circuits) upon determining that one or more autonomous vehicles has traveled through a location a threshold number of times.

Thus, as shown in FIG. 2B, in one or more embodiments the AV prepositioning system 106 utilizes an optimization model to generate a second set of autonomous vehicle waypoints for autonomous vehicles defining a second set of autonomous vehicle pre-matching circuits within subregions (e.g., based on predicted autonomous vehicle requester devices and the locations of the autonomous vehicle).

In addition, the AV prepositioning system 106 can also monitor changes in autonomous vehicles to make modified autonomous vehicle assignments. For example, the AV prepositioning system 106 can identify new autonomous vehicles and generate new autonomous vehicle assignments for the new autonomous vehicles. For example, with regard to FIG. 2B, the AV prepositioning system 106 identifies a new autonomous vehicle 204x. The AV prepositioning system 106 also utilizes an optimization model to determine an autonomous vehicle assignment for the new autonomous vehicle 204x. Specifically, the AV prepositioning system 106 utilizes the optimization model to select the subregion 216. For instance, the AV prepositioning system 106 determines that the subregion 216 has the highest number of unmet predicted autonomous vehicle provider devices (e.g., the highest wait times, highest number of requester devices relative to the number of provider devices, or highest unmet demand).

The AV prepositioning system 106 assigns the autonomous vehicle 204x to the subregion 216 and assigns the autonomous vehicle to a circuit. For example, if a subregion has multiple circuits, the AV prepositioning system 106 can select a particular circuit. The AV prepositioning system 106 can select a circuit based on a variety of features or factors, such as, the number of autonomous vehicles already assigned to circuits within the subregion, the location of predicted requester devices, the number of times autonomous vehicles have traversed a particular circuit, or the length (or cost) of a particular circuit.

Upon assigning the autonomous vehicle to a circuit, the AV prepositioning system 106 also selects a waypoint for the autonomous vehicle. For example, with regard to the autonomous vehicle 204x, the AV prepositioning system 106 selects an initial waypoint for the autonomous vehicle to travel toward to initiate a circuit. The AV prepositioning system 106 can also select this waypoint based on a variety of factors. For example, the AV prepositioning system 106 can select an initial waypoint based on a distance between the current location of the autonomous vehicle and the waypoints (e.g., select the waypoint closest to the autonomous vehicle). The AV prepositioning system 106 can also select the initial waypoint based on locations of anticipated requester devices (e.g., select the waypoint that will bring the autonomous vehicle closest to a location of anticipated requester devices within the lowest amount of time).

As mentioned previously, in some implementations, the AV prepositioning system 106 transmits digital prepositioning instructions by transmitting one or more waypoints. For example, with regard to the autonomous vehicle 204x, the AV prepositioning system 106 transmits the initial waypoint to the autonomous vehicle 204x. The autonomous vehicle 204x can utilize the transportation matching system 104, an onboard computing device, or a third-party system to determine a route from a current location to the initial waypoint. The autonomous vehicle 204x then determines operational instructions to navigate the vehicle along the route to the initial waypoint.

As mentioned above, the AV prepositioning system 106 can also transmit additional (e.g., fallback) waypoints to an autonomous vehicle. For example, in the event of a system outage or connectivity problem, the AV prepositioning system 106 can transit fallback waypoints so that the autonomous vehicle has continuous instructions to traverse along a circuit. For instance, the AV prepositioning system 106 can transmit a second waypoint on a circuit to the autonomous vehicle 204x in the event the AV prepositioning system 106 becomes disconnected from the autonomous vehicle 204x for a brief period. The autonomous vehicle 204x can travel to the initial waypoint and then travel to the fallback waypoint if the autonomous vehicle 204x does not receive additional prepositioning instructions from the AV prepositioning system 106.

Although FIGS. 2A-2B illustrate particular numbers, styles, and/or types of subregions, waypoints, and circuits, the AV prepositioning system 106 can generate a variety of different subregions, waypoints, and circuits. For example, in one or more embodiments, the AV prepositioning system 106 generates subregions having a different shape (e.g., circular, polygonal, etc.). Similarly, the AV prepositioning system 106 can generate circuits having more than two waypoints (e.g., 3, 4, or 5 waypoints). Moreover, although FIGS. 2A-2B illustrates circuits utilizing arcs, it will be appreciated that the AV prepositioning system 106 can generate circuits that include a series of waypoints or generate circuits that include navigational routes along streets traversable by autonomous vehicles.

In addition, although FIGS. 2A-2B describes the AV prepositioning system 106 determining subregions, waypoints, and circuits prior to (or separate from) generating autonomous vehicle assignments, in some embodiments, the AV prepositioning system 106 generates autonomous vehicle assignments, subregions, waypoints, and circuits utilizing a consolidated algorithm, process, or routine. For example, rather than determining waypoints/circuits and then assigning autonomous vehicles, the AV prepositioning system 106 can identify autonomous vehicles and generate unique waypoints/circuits for the identified autonomous vehicles. Thus, generating waypoints/circuits can include the AV prepositioning system 106 utilizing the algorithms and acts described above to generate unique waypoints/circuits for individual autonomous vehicles within a particular subregion. Accordingly, the AV prepositioning system 106 can utilize an optimization model to generate autonomous vehicle waypoints for autonomous vehicles defining a set of autonomous vehicle pre-matching circuits within subregions (e.g., based on predicted autonomous vehicle requester devices and the locations of the autonomous vehicle).

Figure 3:
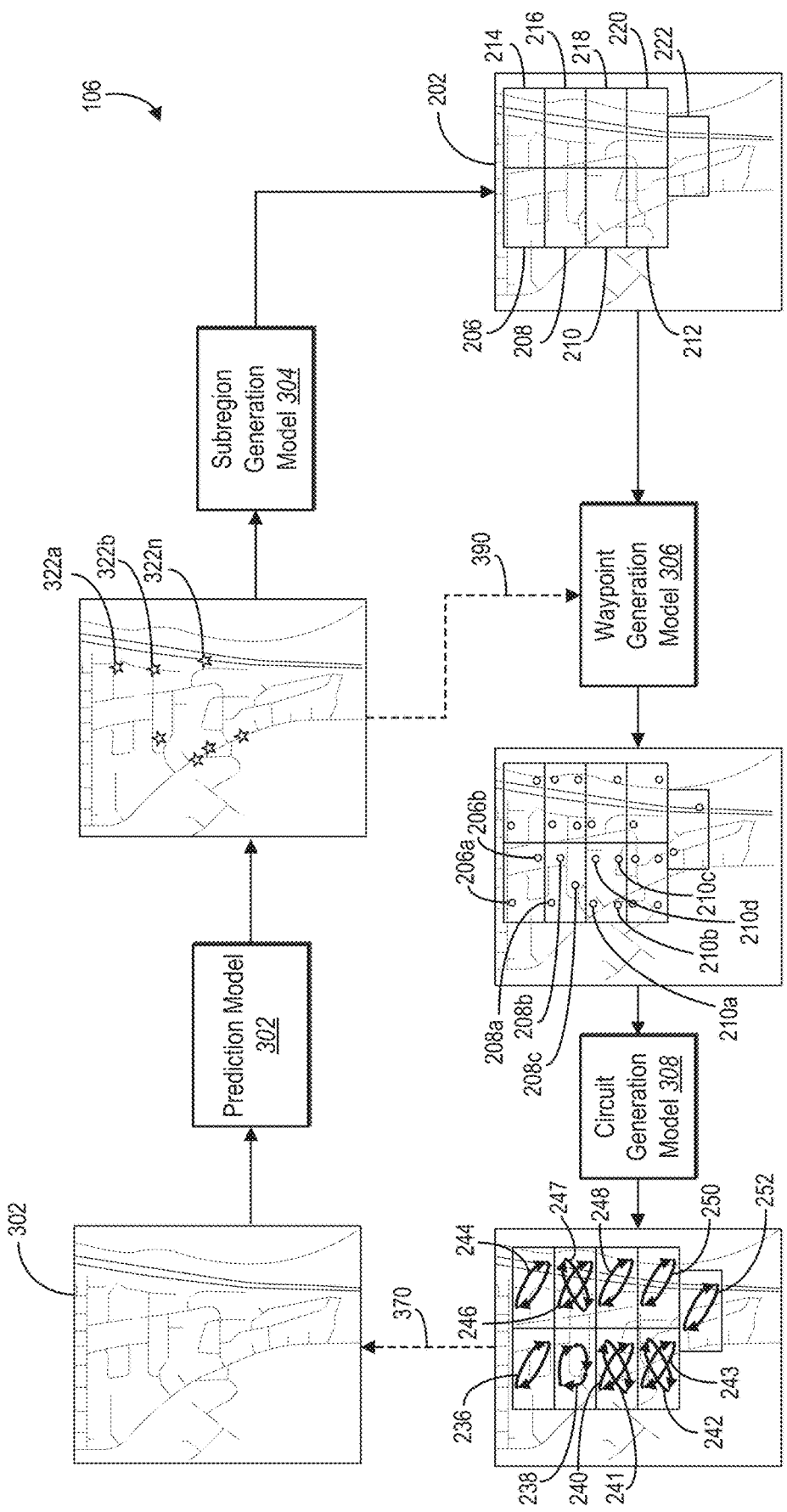
FIG. 3 illustrates a schematic diagram of utilizing computer-implemented models to generate autonomous vehicle prepositioning assignments in accordance with one or more embodiments.

As mentioned above, in one or more embodiments the AV prepositioning system 106 divides a transportation service area into a plurality of subregions and determines corresponding waypoints and circuits for the subregions. For example, FIG. 3 illustrates an AV prepositioning system 106 utilizing a prediction model 302 and subregion generation model 304 to determine the subregions 206-222, utilizing a waypoint generation model 306 to determine waypoints, and utilizing a circuit generation model 308 to define circuits within the subregions 206-222. Moreover, as shown, the AV prepositioning system 106 can iterate through one or more of the prediction model 302, the subregion generation model 304, the waypoint generation model 306, and the circuit generation model 308 to dynamically update the predicted autonomous vehicle requests, the subregions, the waypoints, and/or the circuits.

As illustrated in FIG. 3, in one or more embodiments, the AV prepositioning system 106 determines a transportation service area 202. For example, the AV prepositioning system 106 may define the transportation service area 202 as having a boundary within a wider geographic region. For instance, the transportation service area 202 can include a city, metropolitan region, or geohash. The AV prepositioning system 106 may incorporate a predefined area as the transportation service area 202.

As mentioned, in one or more embodiments, the AV prepositioning system 106 utilizes a prediction model 302 to determine predicted autonomous vehicle requester devices 322a-322n for the transportation service area 202. The prediction model 302 generates a number and/or location of predicted autonomous vehicle requests within the transportation service area 202. For instance, the predicted autonomous vehicle requests may be defined spatially and/or temporally. In other words, the prediction model 302 may output locations and/or times of predicted autonomous vehicle requests. The prediction model 302 can generate predicted autonomous vehicle requester devices in a variety of forms. For instance, the prediction model 302 can generate an anticipated autonomous vehicle demand within a subregion for a particular time range (e.g., within the next 15 minutes, 30 minutes, or an hour) or an anticipated unmet demand for a subregion.

The AV prepositioning system 106 can utilize a variety of features or signals in generating the predicted autonomous vehicle requests via the prediction model 302. For example, in one or more embodiments, the AV prepositioning system 106 utilizes boundaries of the transportation service area 202 and one or area features. To illustrate, the AV prepositioning system 106 can provide current traffic conditions, a current number of requester devices in the transportation service area 202, a current number of provider devices (autonomous vehicles) in the transportation service area 202, a current time, and/or current/upcoming events within the transportation service area 202.

The AV prepositioning system 106 can utilize a variety of computer-implemented models for the prediction model 302. For example, in some embodiments, the prediction model 302 is a statistical or heuristic model. In some embodiments, the prediction model 302 is a machine learning model. A machine learning model refers to a computer-implemented model that is tuned or trained based on inputs to generate predictions, classifications, or approximate unknown functions. In particular, the term machine-learning model can include a neural network that includes interconnected neurons arranged in layers that communicate and learn to approximate complex functions and generate outputs based on a plurality of inputs provided to the model. The term machine-learning model includes deep convolutional neural networks ("CNNs"), fully convolutional neural networks ("FCNs"), a multilayer perceptron ("MLP"), or recurrent neural networks ("RNNs") such as long short-term memory neural networks ("LSTMs"). Additionally or alternatively, the term machine-learning model includes a random forest model, a series of gradient boosted decision trees (e.g., XGBoost algorithm), a linear regression, a support vector machine, or a logistic regression.

In one or more implementations, the AV prepositioning system 106 informs the prediction model 302 utilizing historical information (e.g., historical requests/historical requester devices). For example, the prediction model 302 may evaluate a database of historical requester device vehicle requests to determine likely upcoming requests based on various factors of the historical data, such as pickup locations of requests, drop-off locations of requests, times of day of requests, times or seasons of year of requests, whether the requests were for commercial or personal purposes, and other available information such as special events associated with the pickup and/or drop-off locations.

In one or more embodiments, the AV prepositioning system 106 trains a machine learning model utilizing historical information. For example, the AV prepositioning system 106 trains a machine learning model (such as a neural network) by generating predicted autonomous vehicle requester devices and comparing the prediction with an actual (ground truth) number of requester devices. Thus, for instance, the AV prepositioning system 106 provides a machine learning model with contextual input data for a training period, generates predicted autonomous vehicle requests, and then monitors the actual predicted autonomous vehicle requests to determine a ground truth. The AV prepositioning system 106 then compares the ground truth with the prediction to determine a measure of loss and modify parameters of the machine learning model over time.

In one or more embodiments, the predicted autonomous vehicle requester devices are filtered or tuned specifically to autonomous vehicles. For example, the AV prepositioning system 106 can filter or remove anticipated requester devices/requests from areas that autonomous vehicles cannot access (e.g., areas where autonomous vehicles are prohibited from stopping, parking, or entering). Similarly, the AV prepositioning system 106 can remove/filter anticipated requester devices/requests that will not accept transportation from autonomous vehicles. Indeed, many requester devices will not accept transportation matches with autonomous vehicles. Accordingly, in one or more embodiments, the AV prepositioning system 106 informs or trains the prediction model 302 based on requester devices that will accept transportation matches with autonomous vehicle (e.g., excluding requester devices that will not accept transportation matches with autonomous vehicles). In this manner, the AV prepositioning system 106 utilizes a prediction model 302 to generate predicted autonomous vehicle requester devices that reflect the true demand for autonomous vehicles within a subregion.

As mentioned above, the prediction model 302 may utilize a variety of real-time signals to generate and update the predicted autonomous vehicle requester devices 322a-322n. Thus, for example, as traffic, current requests, current autonomous vehicles, weather, or other area features change over time, the AV prepositioning system 106 can generate additional predictions utilizing the prediction model 302.

Upon determining predicted autonomous vehicle requester devices 322a-322n, the AV prepositioning system 106 utilizes the predicted autonomous vehicle requests to inform other components of the AV prepositioning system 106. As mentioned, in one or more embodiments, the AV prepositioning system 106 utilizes a subregion generation model 304 to determine subregions 206-222 in the transportation service area 202.

For example, the AV prepositioning system 106 inputs predicted autonomous vehicle requests from the prediction model 302 to the subregion generation model 304. The subregion generation model 304 then generates boundaries of one or more subregions 206-222 within the transportation service area 202. In addition to predicted autonomous vehicle requests, the AV prepositioning system 106 can utilize a variety of inputs to the subregion generation model 304 in generating subregions, such as historical/current pickup locations, historical/current drop-off locations, geopolitical boundaries/routes/roadways within the transportation area, autonomous vehicle accessibility locations, and/or various thresholds.

As mentioned, in some implementations, the subregion generation model 304 generates the subregions based on the predicted autonomous vehicle requests from the prediction model 302. For example, the subregion generation model 304 may consider the density of predicted requests across the transportation service area 202. In portions of the transportation service area 202 where there is a relatively high density of predicted requests, the subregion generation model 304 may dedicate a relatively large number of small subregions. In portions of the transportation service area 202 where there is a relatively low density of predicted requests, the subregion generation model 304 may dedicate fewer subregions having larger areas. In some embodiments, the subregion generation model 304 may dynamically update the subregions 206-222 based on expected changes in the predicted requests over time, such as over the course of a day.

The subregion generation model 304 may additionally (or alternatively) generate the subregions based on autonomous vehicle accessibility locations. For example, if there are areas within the transportation service area 202 in which autonomous vehicles are prohibited from traveling (such as by law or regulation), the subregion generation model 304 may exclude such areas from the subregions 206-222. As another example, if there are locations on roadways at which autonomous vehicles are incapable of carrying out a required maneuver to operate along the roadway, the subregion generation model 304 may exclude such locations from the subregions 206-222. In this way, the subregion generation model 304 may determine the subregions 206-222 to ensure that the geographic areas included within each subregion are accessible by autonomous vehicles.

In addition, in one or more embodiments, the AV prepositioning system 106 utilizes various thresholds to control the size of one or more subregions. For example, the AV prepositioning system 106 can utilize a minimum size threshold (e.g., that requires a subregion to exceed a minimum size). Similarly, the AV prepositioning system 106 can utilize a maximum size threshold (e.g., that requires a subregion to be smaller than a maximum size). For example, the AV prepositioning system 106 can determine a minimum and/or maximum size threshold based on a desired circuit distance (e.g., to avoid a circuit of less than 1 mile or greater than 10 miles), historical/anticipated requester device density within a transportation area, and/or historical/anticipated autonomous vehicles within a transportation area. The AV prepositioning system 106 may utilize a size-optimization model to optimize sizes of the subregions based on a variety of factors, such as traveling distance, AV range, and/or locations corresponding to the predicted requests from autonomous vehicle requester devices in the transportation service area.

The subregions 206-222 may be arranged in a grid. The subregions 206-222 may take a variety of shapes and sizes. For example, the subregions 206-222 may be rectangular, polygonal, or have other shapes, including curvilinear boundaries. The subregions 206-222 may have uniform shapes or may have disparate shapes, such as in a wire mesh grid of the transportation service area 202. The subregions 206-222 may have uniform sizes or may have disparate sizes.

In some embodiments, the subregion generation model 304 is a rectilinear area divider, wherein a transportation service area 202 is divided into rectangular subregions 206-222 with equal widths and heights. In some embodiments, the subregion generation model 304 uses geohashes to define unique subregions 206-222. In some embodiments, the subregion generation model 304 divides the transportation service area 202 based on zip codes or clusters of zip codes. In some embodiments, the subregion generation model 304 divides the transportation service area 202 based on major roads or throughfares. In some embodiments, the subregion generation model 304 generates circular subregions based on radii from a landmark or point of interest. In some embodiments, some of the subregions may overlap other subregions.

The AV prepositioning system 106 can utilize a variety of different computer-implemented algorithms for subregion generation model 304. For example, the AV prepositioning system 106 can utilize a clustering model (such as a k-means clustering model) that clusters geographic area based on predicted requester devices. The AV prepositioning system 106 can utilize a cutting algorithm (e.g., a graph cut algorithm) that divides a transportation area at different edges utilizing edge strengths corresponding to predicted requester devices. The AV prepositioning system 106 can also utilize a machine learning model, an optimization model, or objective function for the subregion generation model 304.

As mentioned, in one or more embodiments, the AV prepositioning system 106 utilizes a waypoint generation model 306 to determine the autonomous vehicle waypoints 206a-206b, 208a-208b, etc. For example, the AV prepositioning system 106 inputs the generated subregions 206-222 and the predicted autonomous vehicle requester devices 322a-322n to the waypoint generation model 306. The waypoint generation model 306 then generates two or more waypoints 206a-206b, 208a-208b, etc. For each of the subregions 206-222, the waypoint generation model 306 determines, if any, at least two waypoints. As discussed further below, the at least two waypoints per subregion are used to generate circuits within the subregion. In some embodiments, however, some of the subregions 206-222 might not have any waypoints generated, for example, because the subregion has a low number of predicted autonomous vehicle requests and/or there is an insufficient number of autonomous vehicles to populate a particular subregion.

The AV prepositioning system 106 can utilize a variety of features or signals to generate waypoints utilizing the waypoint generation model 306. The waypoint generation model 306 may generate the autonomous vehicle waypoints 206a-206b, 208a-208b, etc. based on the subregions 206-222 and the locations corresponding to the predicted autonomous vehicle requests. The AV prepositioning system 106 can also generate the waypoints based on a number of available autonomous vehicles, traffic conditions (e.g., a number of vehicles, vehicle density within a subregion, or road closures), historical/current pickup locations within a subregion, historical/current drop-off locations within a subregion, autonomous vehicle accessibility locations within a subregion, weather conditions, structures within a subregion, pickup locations within a subregion, drop-off locations within a subregion, and/or current/upcoming events within a subregion. In some embodiments, the autonomous vehicle waypoints correspond to at least one of a pickup location or a drop-off location. An autonomous vehicle fleet network system may restrict autonomous vehicles to traversing one or more roads corresponding to the autonomous vehicle waypoints. For example, the autonomous vehicle fleet network can identify one or more roads corresponding to the waypoints and require the autonomous vehicles to utilize the one or more roads in traveling between the autonomous vehicle waypoints.

The AV prepositioning system 106 may account for the operational design domain of one or more autonomous vehicles. For example, the AV prepositioning system 106 may consider the routability of an autonomous vehicle through portions of a subregion or transportation service area. The autonomous vehicle routability may be constrained by such factors as types of roads, widths of roads, visibility of markings on roads, visibility of street signs, differentiability of street signs and streetlights from external noise such as commercial signs and lights, environmental conditions, types of traffic participants (e.g., cyclists, pedestrians, heavy equipment, etc.), availability of GPS signals, weather conditions, time-of-day restrictions, and governmental regulations.

The AV prepositioning system 106 can also utilize the waypoint generation model to determine a number of waypoints to generate. For example, the waypoint generation model 306 considers the density of predicted autonomous vehicle requests in a particular subregion to determine the number of waypoints to generate for that subregion. For instance, a subregion with a large number of predicted requests may be given a relatively large number of autonomous vehicle waypoints to ensure better network coverage for the predicted requests. Similarly, the AV prepositioning system 106 can determine the number of waypoints based on a number/density of autonomous vehicles. For example, the AV prepositioning system 106 can determine a greater number of waypoints/circuits to accommodate a greater number/density of autonomous vehicles.

Similarly, the AV prepositioning system 106 can determine a number of waypoints based on a distribution of predicted autonomous vehicle requester devices within a subregion. For example, if there are a variety of different locations with a high number/density of requester devices spread across a subregion, the AV prepositioning system 106 can increase a number of waypoints/circuits to traverse routes that are close these high density areas. In contrast, if the distribution of predicted autonomous vehicle requester devices is concentrated in a small number of locations (or distributed evenly across the whole subregion), the AV prepositioning system 106 can utilize a smaller number of waypoints.

As another example, a subregion that has a relatively small geographic area may be given an above-average number of waypoints to facilitate route differentiation of the autonomous vehicles in the small area. For instance, a subregion may be given three waypoints to help ensure that a circuit generated from those waypoints approximates a triangle, thereby preventing the autonomous vehicle(s) from traversing the same thoroughfare back and forth between what would otherwise be just two waypoints in the circuit. Alternatively, a subregion may be given four or more waypoints, and the waypoints may be utilized to generate more than one circuit in the subregion.

Accordingly, in some embodiments, the waypoint generation model 306 determines more than two, such as three, four, five, or more waypoints. This approach allows the AV prepositioning system 106 to generate circuits (described further below) that are geographically adjacent to areas of high density predicted autonomous vehicle requester devices.

The AV prepositioning system 106 can utilize a variety of computer-implemented models to generate waypoints. For example, the AV prepositioning system 106 can utilize an optimization model or objective function. To illustrate, AV prepositioning system 106 can utilize an objective function that seeks to minimize the distance between waypoints (or routes connecting waypoints) and locations corresponding to predicted requester devices. In some embodiments, the AV prepositioning system 106 identifies high-density locations (e.g., high-demand roads, areas, or routes). The AV prepositioning system 106 determines a distance (e.g., an average or cumulative distance) between the high-density locations and the waypoints (and/or routes between the waypoints). The AV prepositioning system 106 then selects waypoints to reduce (e.g., minimize) the distance.

Thus, in some embodiments, the waypoint generation model 306 determines waypoints 206a-206b, 208a-208b, etc. that are geographically near the predicted autonomous vehicle requester devices 322a-322n. As another example, the waypoint generation model 306 may determine waypoints 206a-206b, 208a-208b, etc. that geographically bracket areas of a high density of predicted autonomous vehicle requester devices 322a-322n.

In some embodiments, the AV prepositioning system 106 utilizes an objective function or optimization model that selects waypoints to improve other variables or objectives. For example, the AV prepositioning system 106 can utilize an objective function that selects waypoints with an objective to minimize travel time (or travel distance) for autonomous vehicles traversing the waypoints in responding to predicted autonomous vehicle requester devices. In some embodiments, the AV prepositioning system 106 seeks to increase (e.g., maximize) coverage a subregion in selecting waypoints. In some implementations, the AV prepositioning system 106 penalizes (e.g., ads a cost or penalty) for waypoints/routes that require travel on certain roads (e.g., congested roads, downtown streets, etc.).

As mentioned above, in some implementations the AV prepositioning system 106 also generates waypoints based on autonomous vehicle accessibility locations within a subregion. For example, the AV prepositioning system 106 can avoid locations inaccessible to autonomous vehicles (e.g., areas where autonomous vehicles are prohibited from entering) in selecting waypoints. Thus, the AV prepositioning system 106 can omit/filter waypoints or routes that include inaccessible locations (and/or reward selection of autonomous vehicle accessibility locations).

In some implementations, the AV prepositioning system 106 also selects waypoints based on distances between waypoints. For example, the AV prepositioning system 106 can impose one or more waypoint distance thresholds in selecting waypoints. To illustrate, the AV prepositioning system 106 can impose a minimum waypoint distance threshold (e.g., to avoid autonomous vehicles traveling less than a mile between waypoints). Similarly, the AV prepositioning system 106 can impose a maximum waypoint distance threshold (e.g., to avoid waypoints that are inefficiently spaced and require excessive travel for autonomous vehicles). In some implementations, the AV prepositioning system 106 implements distance as a cost (e.g., distance over a threshold is a cost to be minimized) or objective (e.g., moving the distance toward a target objective distance).

In one or more embodiments, the AV prepositioning system 106 utilizes one of the machine learning models discussed herein as the waypoint generation model. For example, the AV prepositioning system 106 can utilize a reinforcement learning model to iteratively select waypoints to improve (e.g., maximize) a particular reward. As discussed in the paragraphs above, the AV prepositioning system 106 can utilize a variety of rewards for such a reinforcement learning approach (e.g., reduced travel time to predicted autonomous vehicle requests, reduced unmet demand, reduced distance to predicted autonomous vehicle requests, etc.). For example, in some implementations, the AV prepositioning system 106 utilizes a Markov Decision Process to select waypoints to improve a reward in transitioning from a current state to a next state.

As shown in FIG. 3, in one or more embodiments, the AV prepositioning system 106 utilizes a circuit generation model 308 to determine circuits in the subregions 206-222. For example, the AV prepositioning system 106 inputs the subregions 206-222 and the autonomous vehicle waypoints 206a-206b, 208a-208b, etc. into the circuit generation model 308. The circuit generation model 308 then generates circuits 236-252 within the subregions 206-222. For example, the circuit generation model 308 can combine waypoints into one or more circuits within a subregion. To illustrate, the AV prepositioning system 106 can utilize the circuit generation model to analyze six waypoints within a subregion and generate a single circuit (e.g., a circuit with six waypoints) or two circuits (e.g., two circuits, each with three waypoints).

In some embodiments, the circuit generation model 308 is a mapping tool that plans a vehicle route connecting sequential waypoints in a subregion. For example, in the subregion 206, the circuit generation model 308 connects the waypoints 206a and 206b with routes for each direction (e.g., away from waypoint 206a towards the waypoint 206b, and away from waypoint 206b towards waypoint 206a). Each route may traverse substantially the same roads and thoroughfares, or the routes may deviate one from another. In connecting the waypoints 206a and 206b with routes (including round-trip routes), the circuit generation model 308 creates a circuit along which an autonomous vehicle can travel from the waypoint 206a to the waypoint 206b and back to the waypoint 206a.

As discussed above, in some embodiments, a circuit comprises more than two waypoints. The circuit includes routes that traverse roads and thoroughfares from one waypoint to the next in sequential fashion. For example, a route in the circuit 238 may begin at waypoint 208a, traverse to the waypoint 208b, then traverse to the waypoint 208c, then return to waypoint 208a, thereby connecting the waypoints in a loop. The AV prepositioning system 106 may control whether the circuit is directed clockwise or counterclockwise.

As mentioned previously, in some embodiments the AV prepositioning system 106 does not determine the precise routes corresponding to a circuit (but allows the autonomous vehicle to determine the specific route to travel to the next waypoint). In such implementations, the circuit generation model 308 can generate a sequential ordering of the waypoints indicating legs between the waypoints (without defining the precise route between the waypoints).

Also as discussed above, in some embodiments, a subregion may comprise more than one circuit. For example, the subregion 210 comprises the circuits 240 and 241. The circuits 240 and 241 may share some common waypoints, or may each comprise separate waypoints. For example, the circuit 240 may comprise the waypoints 210*a* and 210*b*, while the circuit 241 comprises the waypoints 210*c* and 210*d*. As explained above, by generating multiple circuits in a subregion, the AV prepositioning system 106 helps to distribute network traffic efficiently and flexibly for a high density of predicted autonomous vehicle requests.

The AV prepositioning system 106 can utilize a variety of approaches to determining the number of circuits to generate within a subregion. For example, in some embodiments, the AV prepositioning system 106 generates multiple circuits based on the number of autonomous vehicles (e.g., when the number of autonomous vehicles surpasses a threshold number of autonomous vehicles the AV prepositioning system 106 generates a second circuit and/or additional waypoints). The AV prepositioning system 106 can also select the number of circuits based on a predicted number of requester devices. In addition, the AV prepositioning system 106 can select the number of circuits based on a number of times that autonomous vehicles traverse a location within a circuit (e.g., add or change a circuit upon detecting that autonomous vehicles traverse a neighborhood or road a threshold number of times).

Although FIG. 3 illustrates a separate circuit generation model 308, in one or more implementations, the AV prepositioning system 106 utilizes a combined model that generates circuits at the same time as generating the waypoints (e.g., the system generates waypoints and circuits as a unified output). Indeed, in some implementations, the AV prepositioning system 106 generates circuits as a list of waypoints to be transmitted to autonomous vehicles (allowing the autonomous vehicles to generate routes between the waypoints). In some implementations, the AV prepositioning system 106 generates circuits by utilizing the waypoint generation model 306 to generate separate lists of waypoints for each circuit within a subregion.

As mentioned above, the AV prepositioning system 106 also generates autonomous vehicle assignments to the subregions, circuits, and/or waypoints. Indeed, the AV prepositioning system 106 can utilize an optimization model to assign autonomous vehicles to waypoints and then transmit the waypoints to the autonomous vehicles. Accordingly, the AV prepositioning system 106 can utilize the prediction model 302, the subregion generation model 304, the waypoint generation model 306, and/or an optimization model to generate/determine autonomous vehicle waypoints for autonomous vehicles. Additional detail regarding generating autonomous vehicle assignments is provided below (e.g., in relation to FIG. 4).

As mentioned above, in some embodiments, the AV prepositioning system 106 utilizes the generated subregions, waypoints, and circuits in a dynamic system. That is, the AV prepositioning system 106 regularly updates the subregions, the waypoints, and/or the circuits. For example, as show in FIG. 3, the AV prepositioning system 106 repeats 370 the generation of the subregions, waypoints, and/or circuits in iterative fashion to keep the subregions, waypoints, and/or circuits updated using real-time information. For example, the AV prepositioning system 106 repeats utilization of the prediction model 302, the subregion generation model 304, the waypoint generation model 306, and/or the circuit generation model 308. Moreover, although not shown, the AV prepositioning system 106 can also iteratively generate autonomous vehicle assignments (e.g., determine waypoints for the autonomous vehicles) to efficiently preposition the autonomous vehicles within the transportation service area 202 over time.

By dynamically updating the subregions, waypoints, and circuits in the transportation service area 202, the AV prepositioning system 106 facilitates accurate placement of the circuits and autonomous vehicles based on the best available information. This lends to more efficient prepositioning of the autonomous vehicles and helps to increase network efficiency and bandwidth.

In some embodiments, the AV prepositioning system 106 repeats 390 the generation of waypoints in iterative fashion while reusing the previously generated subregions. In other words, the AV prepositioning system 106 may iterate the prediction model 302, the waypoint generation model 306, and the circuit generation model 308 without iterating the subregion generation model 304. In this way, the AV prepositioning system 106 may update the predicted autonomous vehicle requests and the waypoints (and circuits) without updating the subregions. This approach can help to reduce computing demand and increase network bandwidth for the AV prepositioning system 106, while at the same time enabling dynamic updates of the waypoints and circuits based on newly available information from the prediction model 302.

To illustrate the dynamic AV prepositioning process, for example, a first iteration of the AV prepositioning system 106 determines a first set of autonomous vehicle waypoints defining a first set of circuits within subregions. A subsequent iteration of the AV prepositioning system 106 determines a second set of autonomous vehicle waypoints defining a second set of circuits within the subregions (whether the subregions are updated or remain the same from the first iteration). The AV prepositioning system 106 bases the update to the waypoints and circuits on the predicted autonomous vehicle requester devices. The AV prepositioning system 106 then assigns autonomous vehicles to traverse the second set of circuits by determining and transmitting waypoints, as described further below.

Figure 4:
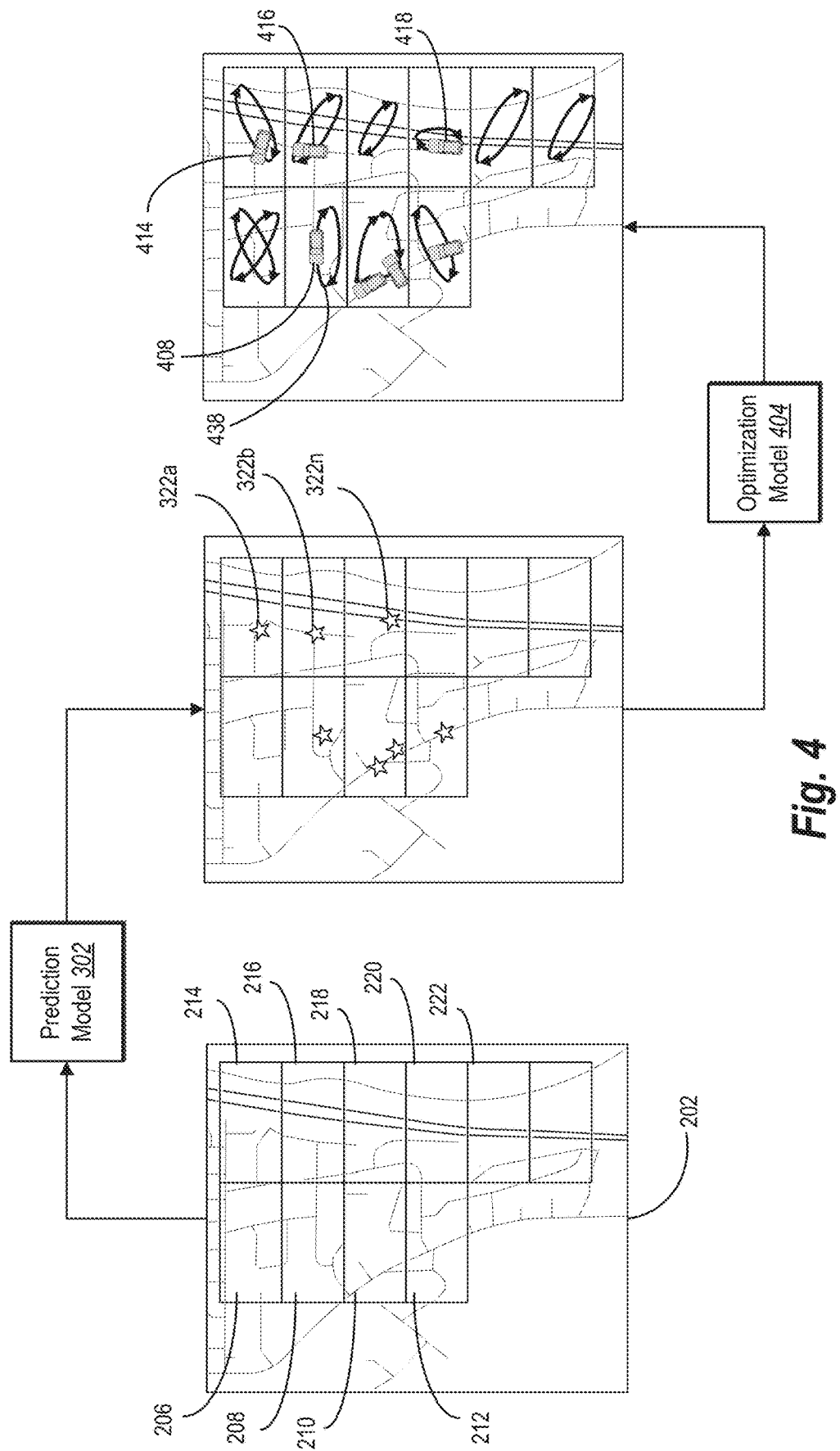
FIG. 4 illustrates a schematic diagram of an autonomous vehicle prepositioning system determining autonomous vehicle assignments and transmitting digital prepositioning instructions in accordance with one or more embodiments.

As mentioned above, in one or more embodiments the AV prepositioning system 106 determines waypoints for autonomous vehicles and transmits these waypoints to autonomous vehicles. In particular, the AV prepositioning system 106 determines autonomous vehicle assignments for traversing a set of circuits within the subregions. For example, FIG. 4 illustrates the AV prepositioning system 106 utilizing the prediction model 302 to determine predicted autonomous vehicle requester devices 322*a*-322*n*. Additionally, in FIG. 4, the AV prepositioning system 106 utilizes an optimization model 404 to determine autonomous vehicle assignments for one or more autonomous vehicles 408-418 in a vehicle fleet.

As discussed above in connection with FIG. 3, the AV prepositioning system 106 utilizes the prediction model 302 to determine predicted autonomous vehicle requester devices 322*a*-322*n*. As illustrated in FIG. 4, the AV prepositioning system 106 utilizes the prediction model 302 to determine the predicted autonomous vehicle requester devices 322*a*-322*n* on a subregion level. In other words, the AV prepositioning system 106 determines predicted autonomous vehicle requests within each of the subregions 206-222. The AV prepositioning system 106 then uses this information in making autonomous vehicle assignments.

The AV prepositioning system 106 can utilize a variety of features or signals to generate autonomous vehicle assignments for subregions, circuits, and/or waypoints. Indeed, in addition to predicted autonomous vehicle requester devices in a variety of forms (e.g., number of autonomous vehicle ride requests within a subregion or unmet demand within a subregion), the AV prepositioning system 106 can also utilize autonomous vehicle locations (e.g., GPS locations), subregions, waypoints, circuits, subregion/waypoint/circuit locations, distances to waypoints, autonomous vehicle states (e.g., idle, transmitting a passenger, traveling to a pickup-location, or prepositioning), historical/current pickup locations, historical/current drop-off locations, and/or traffic conditions in generating autonomous vehicle assignments.

As mentioned, in one or more embodiments, the AV prepositioning system 106 utilizes an optimization model 404 to assign autonomous vehicles to waypoints to traverse a set of circuits within subregions. For example, the optimization model 404 assigns the autonomous vehicle 408 to a waypoint in the circuit 238 in the subregion 208. Similarly, the optimization model 404 assigns the autonomous vehicles 410-418 to waypoints in various circuits in the subregions 210-218.

In some embodiments, the optimization model 404 is a linear programming model. For example, the optimization model 404 may reduce system costs based on a linear combination of unmatched autonomous vehicle requests (e.g., unmet demand) and costs of positioning autonomous vehicles 410-418 to make matches with autonomous vehicle requester devices 322a-322n. To illustrate, a first system cost may include failing to respond to a predicted autonomous vehicle requester device. For example, the first system cost may be the opportunity cost for an autonomous vehicle 408 not to satisfy a match with a requester device 322a that the autonomous vehicle 408 otherwise could have satisfied. Additionally, a second system cost may include modifying locations of the autonomous vehicles. For example, the second system cost may be the time, energy expended, and wear-and-tear of moving an autonomous vehicle 408 into a new subregion/circuit.

In some embodiments, the optimization model 404 is a mixed integer programming model. For example, the optimization model 404 may reduce system costs based on a combination of unmatched autonomous vehicle requests and costs of positioning autonomous vehicles 410-418 to make matches with autonomous vehicle requester devices 322a-322n, while accounting for diminishing returns of positioning autonomous vehicles 410-418 to match the autonomous vehicles 410-418 with the autonomous vehicle requester devices 322a-322n. In some embodiments, the optimization model 404 determines integer parameters and non-integer parameters to reduce the system costs. For example, if a transportation service area has ten autonomous vehicles at a given time, and if the AV prepositioning system 106 expects a first subregion to have between six to ten predicted requests, the AV prepositioning system 106 may direct fewer than ten autonomous vehicles to the first subregion. To carry the example further, if the AV prepositioning system 106 expects a second subregion to have between four to nine predicted requests, the AV prepositioning system 106 may direct six autonomous vehicles to the first subregion, and the remaining four autonomous vehicles to the second subregion. This arrangement may be a more optimal reduction of system costs than, for example, sending all ten autonomous vehicles to the first subregion, where not all ten predicted requests might be realized into actual transportation matches.

The optimization model 404 bases an optimization solution on current locations of the autonomous vehicles 408-418 in the vehicle fleet. For example, system costs may account for the time or distance required to preposition the autonomous vehicle 408. Further, system costs may account for a permissible amount of driving of the autonomous vehicle 408, for example, based on an amount of battery charge remaining in a battery of the autonomous vehicle 408. Thus, for instance, the AV prepositioning system 106 can transmit instructions to travel to a battery charging station (even if there is 10% or 20% battery remaining) based on weighing the system costs of prepositioning the autonomous vehicle and having to later disrupt the autonomous vehicle (e.g., during or immediately prior to a transportation match). Similarly, the AV prepositioning system 106 can continue to transmit prepositioning instructions based on determining that the system cost of traveling to a battery station outweighs the system cost of prepositioning (e.g., where the likelihood of meeting unmet demand on the remaining battery is high).

Indeed, because remaining battery life is a measurable quantity, the AV prepositioning system 106 can monitor and consider this factor in prepositioning autonomous vehicles. As mentioned above, in contrast to other provider devices, this provides more predictability, stability, and reliability to the overall network coverage.

Similarly, autonomous vehicle scheduling is often more measurable and dependable than other provider device approaches. Accordingly, the AV prepositioning system 106 can also take advantage of this reliable information in prepositioning autonomous vehicles. Thus, for example, the AV prepositioning system 106 can determine that autonomous vehicles will come online and stay online for a particular duration (e.g., 8:00 to 10:00), the AV prepositioning system 106 can thus accurately forecast the number of autonomous vehicles available at a particular time and utilizes this forecasting in the various models described above (e.g., in subdividing a transportation service area, determining waypoints, generating circuits, and/or generating autonomous vehicle assignments). This allows the AV prepositioning system 106 to provide further improvements relative to conventional provider device systems.

Similarly, the AV prepositioning system 106 can accurately determine when autonomous vehicles will become available upon finishing transportation requests. Indeed, unlike provider devices that frequently go offline after completing a transportation request, the AV prepositioning system 106 can forecast the end of a transportation service for an autonomous vehicle, and utilize this information for the various models above. This allows the AV prepositioning system 106 to more accurately and efficiently preposition autonomous vehicles. For example, the optimization model 404 determines an estimated time that an autonomous vehicle will arrive at a drop-off location before the autonomous vehicle completes the current transportation. This allows the AV prepositioning system 106 to determine a subsequent prepositioning assignment for the autonomous vehicle before the autonomous vehicle completes the current transportation, thereby minimizing autonomous vehicle downtime and enhancing the efficiency with which the autonomous vehicle fleet network system serves the transportation service area.

Additionally, the AV prepositioning system 106 may consider the location at which an autonomous vehicle will be when completing a current transportation (e.g., a drop-off location) to determine the subsequent prepositioning assignment for the autonomous vehicle. For example, if the autonomous vehicle is currently traveling from a first subregion to a second subregion, the AV prepositioning system 106 accounts for the fact that at the estimated time of arrival of the autonomous vehicle, the autonomous vehicle will be available in the second subregion. Thus, the AV prepositioning system 106 accounts for locations of currently available autonomous vehicles, as well as future locations of currently occupied autonomous vehicles using their estimated times of arrival at those future locations.

Further, the AV prepositioning system 106 can accurately determine locations where autonomous vehicles will be available, because autonomous vehicles more reliably travel to waypoints and/or pickup and drop-off locations than provider devices. For example, an autonomous vehicle is more likely to travel to a precise waypoint location as instructed, and will continue on to a subsequent waypoint location as instructed.

Accordingly, the AV prepositioning system 106 can utilize real-time autonomous vehicle states as part of the optimization model as well. Indeed, the AV prepositioning system 106 can filter (exclude) or include autonomous vehicles having certain states. In some embodiments, the AV prepositioning system 106 analyzes those autonomous vehicles in an idle state. In some embodiments, the AV prepositioning system 106 also analyzes autonomous vehicles traveling to a new prepositioning subregion (e.g., in a go state, without an assigned passenger). Moreover, as just mentioned, the AV prepositioning system 106 can also consider autonomous vehicles currently carrying a passenger that will be idle (e.g., within a threshold period of time). In some implementations, the AV prepositioning system 106 excludes autonomous vehicles traveling to pick up a passenger or autonomous vehicles traveling to a drop-off location outside the transportation service area.

In one or more embodiments, the AV prepositioning system 106 utilizes mixed integer programming optimization as the optimization model 404 (e.g., to solve the optimization problem of reducing various system costs that may have conflicting impacts). In some implementations, the AV prepositioning system 106 utilizes different computer-implemented models to generate autonomous vehicle assignments. For example, the AV prepositioning system 106 can utilize a machine learning model (e.g., a neural network or reinforcement model such as a Markov Decision Process) to generate autonomous vehicle assignments.

In some implementations, the AV prepositioning system 106 utilizes different models for different assignment stages. For example, in some embodiments, the AV prepositioning system 106 generates a subregion assignment utilizing a first model (e.g., an optimization model), generates a circuit assignment within the subregion using a second model (e.g., a heuristic model based on vehicle density of a circuit), and generates a waypoint assignment within the circuit utilizing a third model (e.g., a heuristic model based on distance to the nearest waypoint). Indeed, as discussed above in relation to FIG. 2B, the AV prepositioning system 106 can utilize a combination of models to determine a waypoint for an autonomous vehicle.

As mentioned, in one or more embodiments, the AV prepositioning system 106 transmits digital prepositioning instructions to an autonomous vehicle based on the autonomous vehicle assignments. The digital prepositioning instructions direct the autonomous vehicle to travel to a waypoint in a circuit within a subregion. For example, the AV prepositioning system 106 assigns the autonomous vehicle 408 to the circuit 438 in the subregion 208. Upon the assignment, the AV prepositioning system 106 transmits prepositioning instructions to the autonomous vehicle 408, directing the autonomous vehicle 408 to traverse the circuit 438. The AV prepositioning system 106 instructs the autonomous vehicle 408 to travel towards a first waypoint in the circuit 438. The instructions may further include a subsequent waypoint in the circuit 438, which the autonomous vehicle 408 will travel to upon reaching (or upon coming within a threshold radius of) the first waypoint.

In one or more embodiments, the AV prepositioning system 106 further transmits digital prepositioning instructions to additional autonomous vehicles 410-418. In similar fashion to the instructions transmitted to the autonomous vehicle 408, the AV prepositioning system 106 identifies the additional autonomous vehicles 410-418 and assigns them to various subregions based on outputs from the optimization model 404. The AV prepositioning system 106 likewise determines circuits for each of the autonomous vehicles 410-418 to traverse, each circuit including a two or more waypoints. The AV prepositioning system 106 selects a waypoint for each autonomous vehicle 410-418 to first travel to, based on current locations of each of the autonomous vehicles 410-418. The AV prepositioning system 106 transmits prepositioning instructions to each of the additional autonomous vehicles 410-418 to travel to the selected waypoints.

Figure 5:
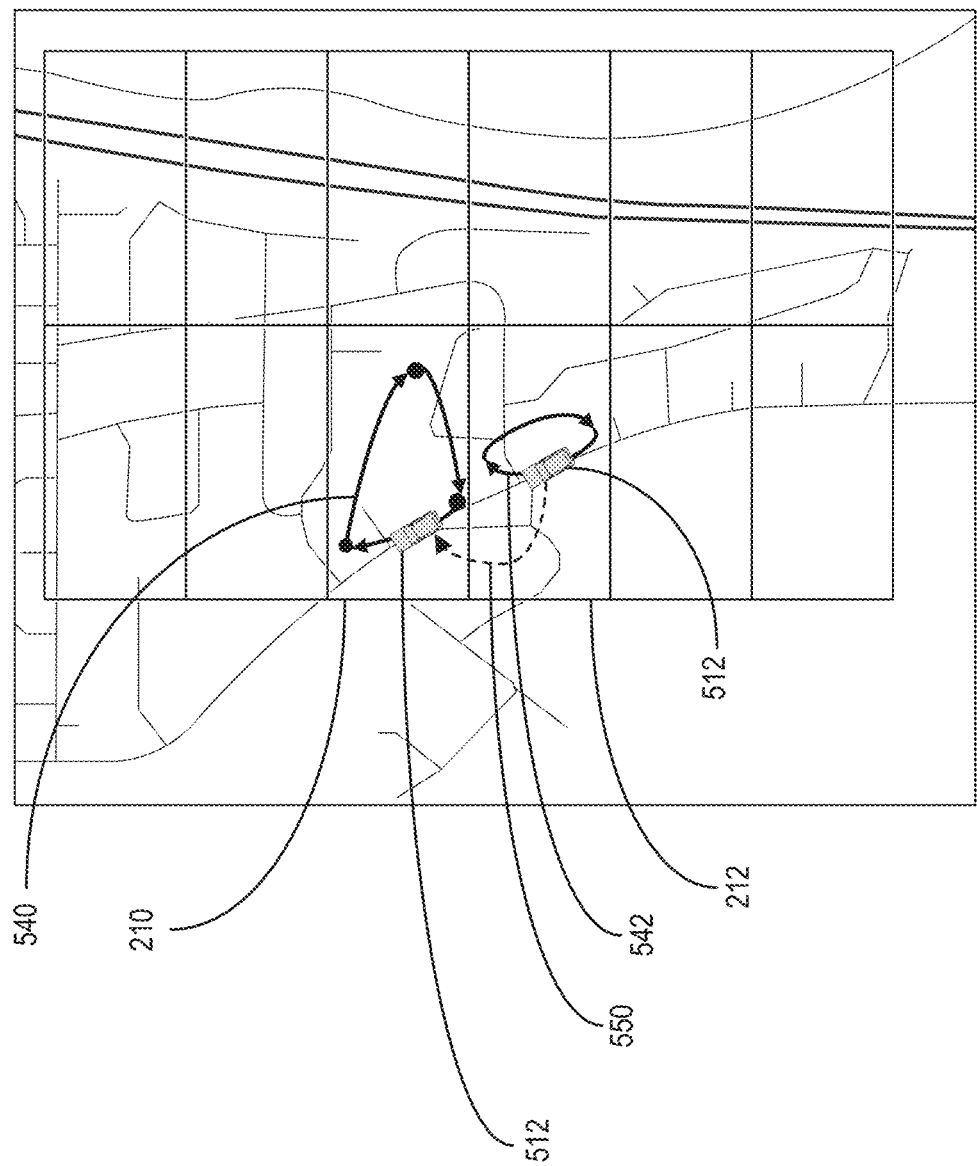
FIG. 5 illustrates a schematic diagram of an autonomous vehicle prepositioning system directing an autonomous vehicle to move from a first subregion to a second subregion in accordance with one or more embodiments.

As mentioned, in one or more embodiments, the AV prepositioning system 106 directs an autonomous vehicle to move from a first subregion to a second subregion and traverse a circuit within the second subregion. For example, FIG. 5 illustrates an autonomous vehicle 512 initially in subregion 212. The autonomous vehicle 512 moves 550 to subregion 210. In particular, the AV prepositioning system 106 determines a new subregion, circuit, and waypoint utilizing the optimization model 404. Moreover, the AV prepositioning system 106 transmits prepositioning instructions (e.g., a new waypoint) to the autonomous vehicle 512, causing the autonomous vehicle 512 to initiate navigation instructions to traverse the circuit 540 instead of the circuit 542.

The AV prepositioning system 106 causes the autonomous vehicle 512 to move from the circuit 540 to the circuit 542, for example, so that the autonomous vehicle 512 will be prepositioned to serve predicted autonomous vehicle requester devices within subregion 210. For example, the optimization model 404 may determine that subregion 212 is overserved by the vehicle fleet and that subregion 210 is underserved by the vehicle fleet. In response to such determination, the AV prepositioning system 106 makes a change to preposition more autonomous vehicles in subregion 210 in anticipation of the predicted autonomous vehicle requests in subregion 210.

Moreover, in prepositioning the autonomous vehicle 512, the AV prepositioning system 106 avoids unnecessary utilization of system resources. Indeed, by utilizing an optimization algorithm, the AV prepositioning system 106 repositions the autonomous vehicle 512 upon determining that a system cost of remaining on the circuit 542 outweighs the system cost of moving the to the circuit 540.

Figure 6:
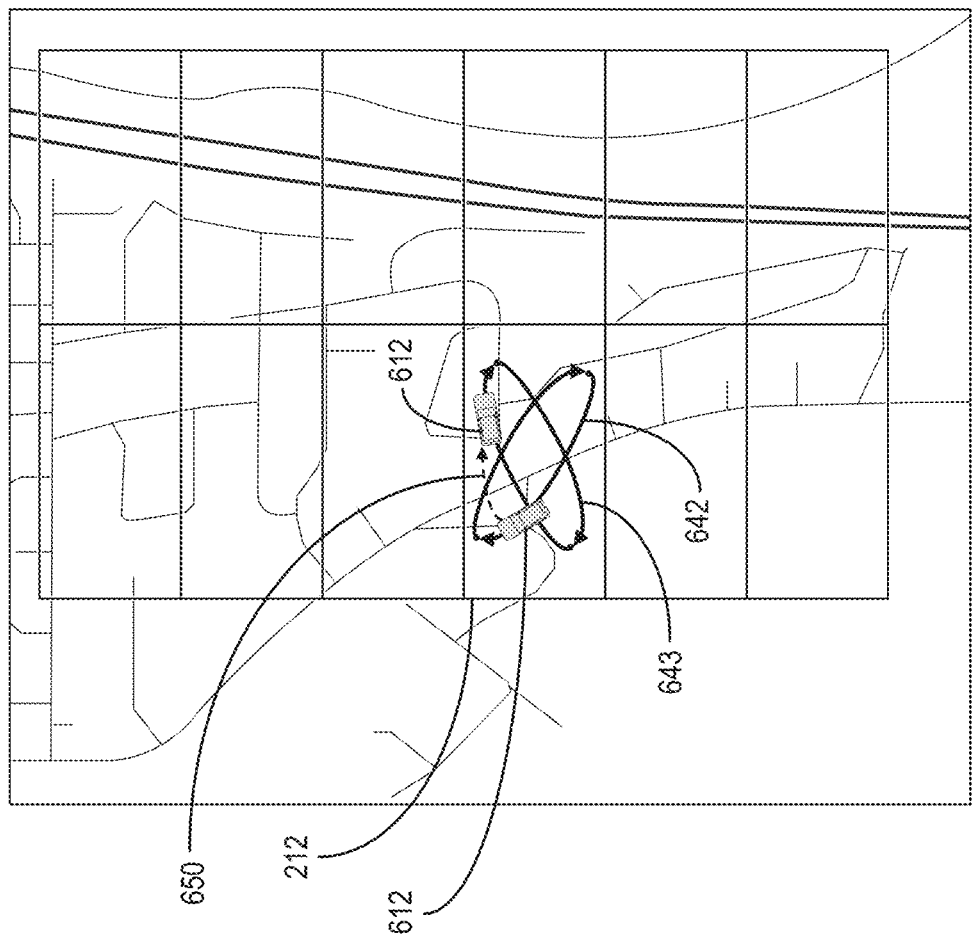
FIG. 6 illustrates a schematic diagram of an autonomous vehicle prepositioning system directing an autonomous vehicle to move from a first circuit to a second circuit within a subregion in accordance with one or more embodiments.

As mentioned, in one or more embodiments, the AV prepositioning system 106 directs an autonomous vehicle to move from a first circuit to a second circuit within the same subregion and to traverse the second circuit. For example, FIG. 6 illustrates an autonomous vehicle 612 initially on circuit 642 in the subregion 212. The autonomous vehicle 612 moves 650 to the circuit 643 in the same subregion 212. The AV prepositioning system 106 determines a new circuit (and waypoint) utilizing the optimization model 404 (or another model). For example, in some embodiments the AV prepositioning system 106 determines improved system costs utilizing the circuit 642. In other embodiments, the AV prepositioning system 106 periodically adjusts circuits of autonomous vehicles (e.g., after a threshold time or threshold number of circuit traversals) to avoid repeatedly traveling over the same routes. In some implementations, the AV prepositioning system 106 moves or changes circuits due to changed conditions (e.g., predicted autonomous vehicle requester devices at a different location). In response to selecting a new circuit, the AV prepositioning system 106 modified prepositioning instructions to the autonomous vehicle 612 (e.g., indicating a new waypoint on the circuit 643), causing the autonomous vehicle to traverse the circuit 643 instead of the circuit 642.

The AV prepositioning system 106 causes the autonomous vehicle 612 to move from the circuit 642 to the circuit 643, for example, so that the autonomous vehicle 612 will be prepositioned to serve predicted autonomous vehicle requester devices closer to the routes of the circuit 643. For example, the optimization model 404 may determine that the circuit 642 is overserved by the vehicle fleet and that the circuit 643 is underserved by the vehicle fleet. In response to such determination, the AV prepositioning system 106 makes a change to preposition more autonomous vehicles on the circuit 643 in anticipation of the predicted autonomous vehicle requests adjacent or near the circuit 643.

Figure 7:
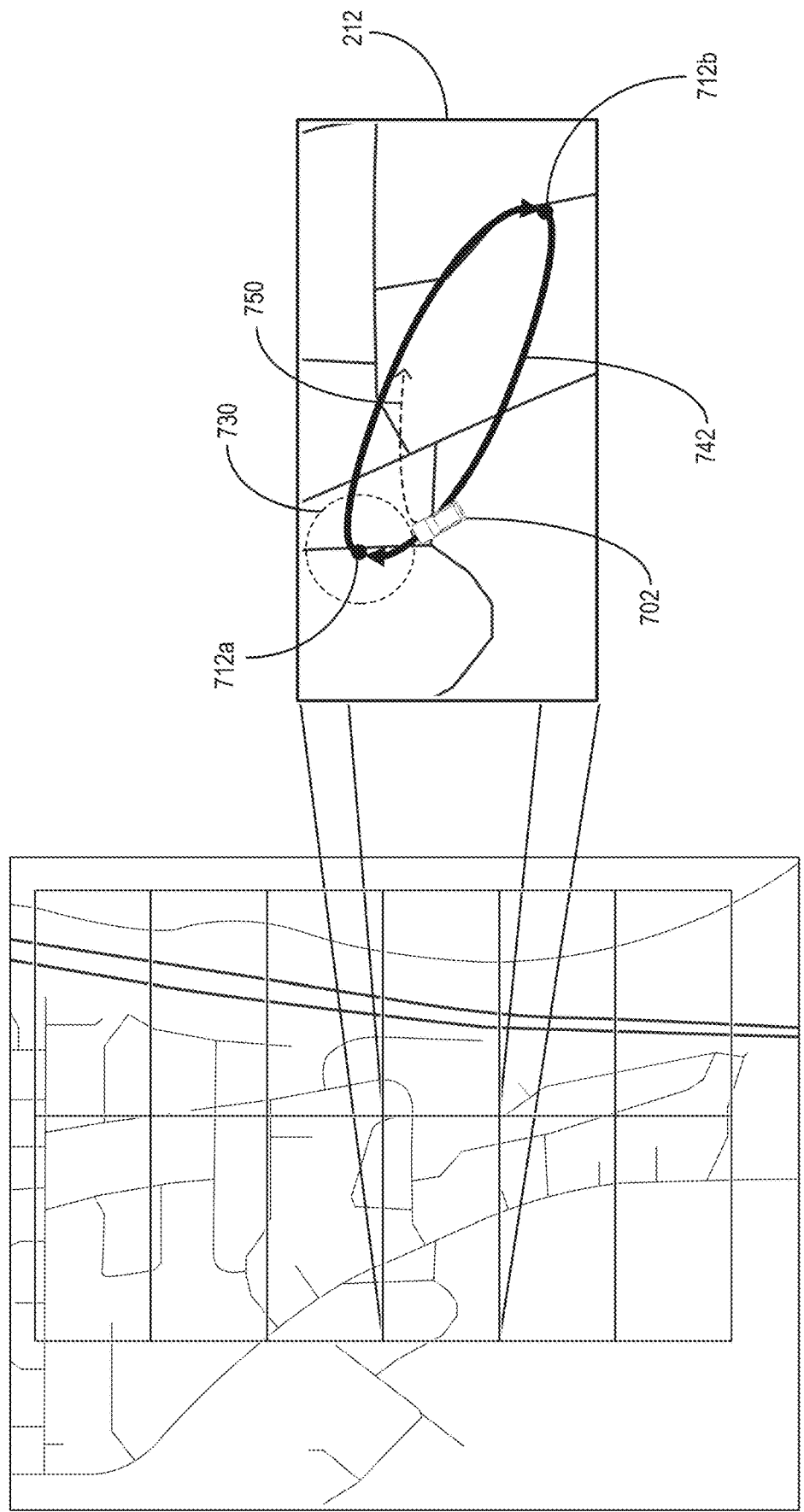
FIG. 7 illustrates a schematic diagram of an autonomous vehicle prepositioning system directing an autonomous vehicle to travel toward a subsequent waypoint once within a threshold radius of a first waypoint in accordance with one or more embodiments.

As mentioned, in one or more embodiments, the AV prepositioning system 106 directs an autonomous vehicle to begin traveling toward a second waypoint in a circuit before fully reaching a first waypoint. For example, FIG. 7 illustrates an autonomous vehicle 702 initially traveling toward a first waypoint 712a on the circuit 742 within the subregion 212. The autonomous vehicle 702 moves 750 toward a second waypoint 712b on the circuit 542 once the autonomous vehicle 702 comes within a threshold radius 730 of the first waypoint 712a.

The threshold radius 730 can include a distance or time metric relative to the first waypoint 712a. For example, the AV prepositioning system 106 can determine the threshold radius 730 as a distance of one-half mile from the first waypoint 712a. Upon detecting that the autonomous vehicle is within the threshold radius (e.g., less than one-half mile from the first waypoint 712a), the AV prepositioning system 106 transmits the second waypoint 712b. Similarly, in some embodiments the threshold radius is a time threshold (e.g., one-minute from the first waypoint 712a). In response to detecting that an estimated time to arrival less than the time threshold, the AV prepositioning system 106 transmits the second waypoint 712b to the autonomous vehicle 702.

The AV prepositioning system 106 can determine the threshold radius 730 based on a variety of factors. In some implementations, the AV prepositioning system 106 determines the threshold radius 730 based on a time or distance to determine re-routing instructions for an autonomous vehicle. For example, the AV prepositioning system 106 can select a one-minute radius based on an average time of one-minute to determine directions and re-route an autonomous vehicle to the second waypoint 712b. Utilizing this approach, the AV prepositioning system 106 can allow the autonomous vehicle time to re-route prior to reaching the first waypoint 712a. This approach avoids causing the autonomous vehicle to stop or pause at the first waypoint 712a.

In some implementations, the AV prepositioning system 106 generates a subsequent waypoint upon reaching a waypoint (or coming within a threshold radius of the waypoint). For example, the AV prepositioning system 106 can detect that an autonomous vehicle is within a threshold radius of a waypoint and generate an additional waypoint in response. Thus, the AV prepositioning system 106 can generate waypoints in real-time as autonomous vehicles travel to and approach a current waypoint.

Although not illustrated, in some embodiments the AV prepositioning system 106 selects waypoints that correspond to stopping points. For example, in some implementations, the AV prepositioning system 106 can identify a waypoint that includes a permissible stopping location for an autonomous vehicle. In such embodiments, the AV prepositioning system 106 can allow the autonomous vehicle to travel all the way to the waypoint (e.g., without redirecting the autonomous vehicle to a second waypoint). In some implementations, the AV prepositioning system 106 selects such stationary waypoints as part of the optimization approach. Indeed, the AV prepositioning system 106 can consider system cost associated with an autonomous vehicle staying at a stationary waypoint within a subregion relative to the system cost associated with traveling to a subsequent waypoint.

Figure 8:
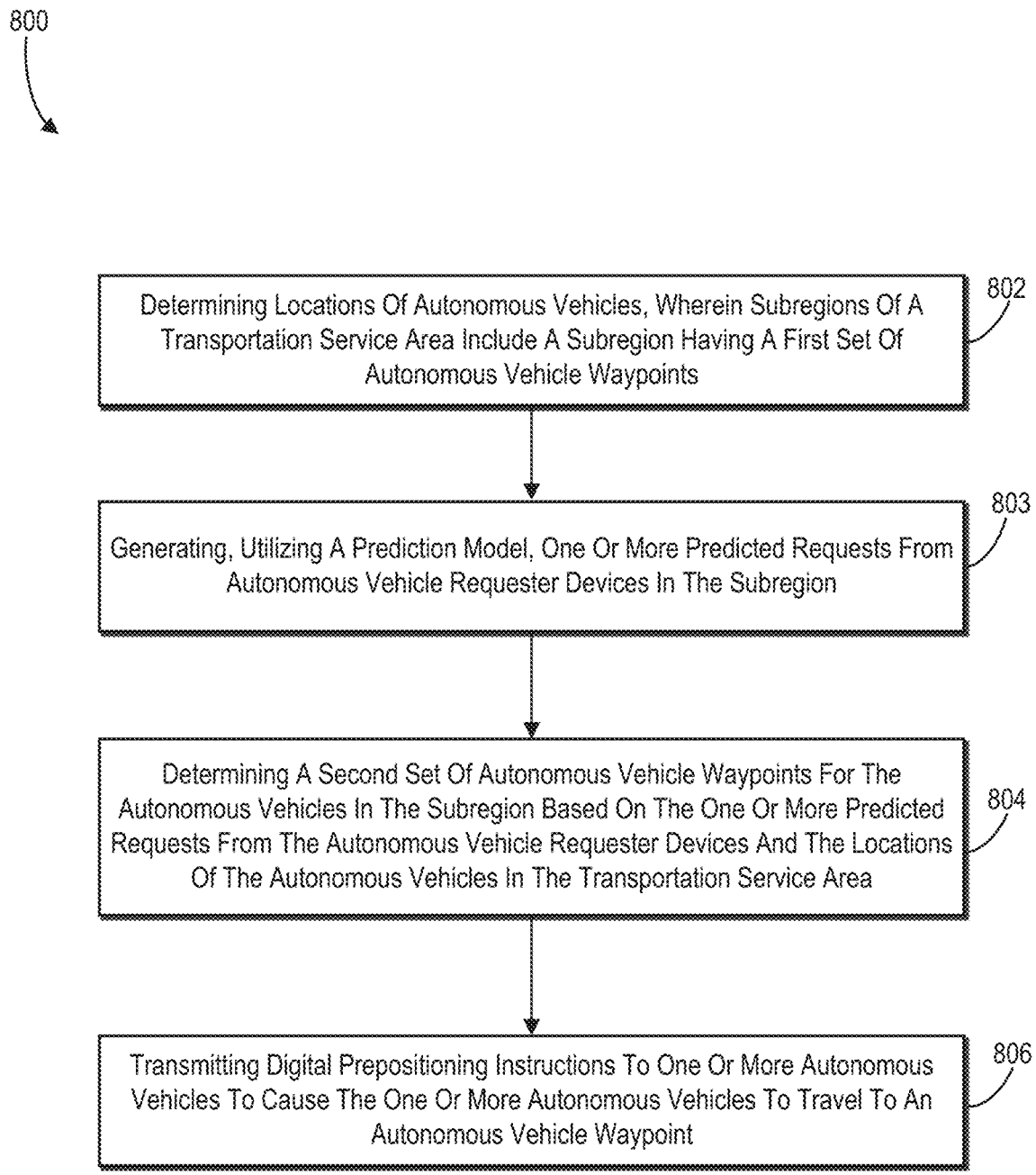
FIG. 8 illustrates a flowchart of a series of acts for generating and transmitting autonomous vehicle prepositioning instructions in accordance with one or more embodiments.

FIGS. 1-7, the corresponding text, and the examples provide a number of different methods, systems, devices, and non-transitory computer-readable media of the AV prepositioning system 106. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for determining locations of autonomous vehicles, generating predicted requests from autonomous vehicle requester devices, determining autonomous vehicle waypoints, and transmitting digital prepositioning instructions directing autonomous vehicles to travel to autonomous vehicle waypoints in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 802 for determining locations of autonomous vehicles, wherein subregions of a transportation service area include a subregion having a first set of autonomous vehicle waypoints. In particular, the act 802 can include determining locations of autonomous vehicles of a vehicle fleet in a transportation service area subdivided into subregions. For example, the subregions include a subregion having a first set of autonomous vehicle waypoints defining a first set of autonomous vehicle pre-matching circuits within the subregion for the autonomous vehicles to travel prior to receiving transportation matches. Specifically, the act 802 can include dividing the transportation service area into the subregions based on at least one of: autonomous vehicle accessibility locations within the transportation service area and an initial set of one or more predicted requests from autonomous vehicle requester devices in the transportation service area; or one or more locations corresponding to one or more predicted requests from autonomous vehicle requester devices in the subregion. Further, the act 802 can include determining the first set of autonomous vehicle waypoints within a subregion based on one or more locations corresponding to predicted requests from autonomous vehicle requester devices for the subregion. Additionally, the act 802 can include determining, utilizing an autonomous vehicle prediction model, the predicted requests from autonomous vehicle requester devices for the subregions based on historical requester device vehicle requests. Also, the act 802 can include generating subregions in the transportation service area, wherein a size of a subregion within the subregions is based on one or more locations corresponding to one or more predicted requests from autonomous vehicle requester devices in the transportation service area.

As shown in FIG. 8, the series of acts 800 includes an act 803 for generating (or determining), utilizing a prediction model, one or more predicted requests from (autonomous vehicle) requester devices in the subregion.

As shown in FIG. 8, the series of acts 800 includes an act 804 for determining a second set of autonomous vehicle waypoints for the autonomous vehicles in the subregion based on the one or more predicted requests from the autonomous vehicle requester devices and the locations of the autonomous vehicles in the transportation service area. In particular, the act 804 can include determining, utilizing an optimization model for reducing system costs, a second set of autonomous vehicle waypoints for the autonomous vehicles defining a second set of autonomous vehicle pre-matching circuits in the subregion based on the one or more predicted requests from the autonomous vehicle requester devices and the locations of the autonomous vehicles in the transportation service area. Specifically, the act 804 can include determining autonomous vehicle assignments for traversing the second set of autonomous vehicle pre-matching circuits within the subregions by utilizing the optimization model to select subregions for the autonomous vehicles based on a first system cost for failing to respond to the predicted requests from autonomous vehicle requester devices and a second system cost for modifying locations of the autonomous vehicles. Further, the act 804 can include selecting an autonomous vehicle waypoint for at least one autonomous vehicle of the autonomous vehicles to travel toward based on distances between the at least one autonomous vehicle and autonomous vehicle waypoints within a subregion.

As shown in FIG. 8, the series of acts 800 includes an act 806 for transmitting digital prepositioning instructions to one or more autonomous vehicles to cause the one or more autonomous vehicles to travel to an autonomous vehicle waypoint. In particular, the act 806 can include transmitting digital prepositioning instructions to one or more autonomous vehicles to cause the one or more autonomous vehicles to travel to an autonomous vehicle waypoint of the second set of autonomous vehicle pre-matching circuits in the subregion. Specifically, the act 806 can include directing at least one of the autonomous vehicles to move from a first autonomous vehicle subregion to a second autonomous vehicle subregion in the transportation service area and traverse an autonomous vehicle pre-matching circuit within the second autonomous vehicle subregion. Additionally, the act 806 can include generating a first autonomous vehicle pre-matching circuit and a second autonomous vehicle pre-matching circuit in an autonomous vehicle subregion of the transportation service area, transmitting a first set of digital prepositioning instructions to a first autonomous vehicle of the vehicle fleet for directing the first autonomous vehicle to traverse the first autonomous vehicle pre-matching circuit, wherein the first autonomous vehicle pre-matching circuit is based on a first location of the first autonomous vehicle, and transmitting a second set of digital prepositioning instructions to a second autonomous vehicle of the vehicle fleet for directing the second autonomous vehicle to traverse the second autonomous vehicle pre-matching circuit, wherein the second autonomous vehicle pre-matching circuit is based on a second location of the second autonomous vehicle. Further, the act 806 can include transmitting additional instructions to the first autonomous vehicle of the vehicle fleet to traverse the second autonomous vehicle pre-matching circuit instead of the first autonomous vehicle pre-matching circuit. The act 806 can also include, in response to determining that an autonomous vehicle is within a threshold radius of an autonomous vehicle waypoint of the second set of autonomous vehicle pre-matching circuits, transmitting modified digital prepositioning instructions directing the autonomous vehicle to travel toward a subsequent autonomous vehicle waypoint defining the second set of autonomous vehicle pre-matching circuits.

The series of acts 800 can also include, in response to identifying an additional autonomous vehicle in an available state, utilizing an optimization model to assign the additional autonomous vehicle to a subregion of the subregions, determining an autonomous vehicle pre-matching circuit within the subregion comprising a plurality of autonomous vehicle waypoints, selecting an autonomous vehicle waypoint of the plurality of autonomous vehicle waypoints based on a location of the additional autonomous vehicle, and transmitting additional prepositioning instructions to the additional autonomous vehicle to travel to the autonomous vehicle waypoint.

The series of acts 800 can further include generating a match between a requester device and an autonomous vehicle, and providing transportation instructions to the autonomous vehicle to deviate from an autonomous vehicle pre-matching circuit to a location corresponding to the requester device.

The series of acts 800 can also include wherein the one or more autonomous vehicles travel between autonomous vehicle waypoints of the second set of autonomous vehicle pre-matching circuits in the subregion, and the autonomous vehicle waypoints correspond to at least one of a pickup location or a drop-off location and the (autonomous vehicle) fleet network system restricts the one or more autonomous vehicles to traversing one or more roads corresponding to the autonomous vehicle waypoints.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 9:
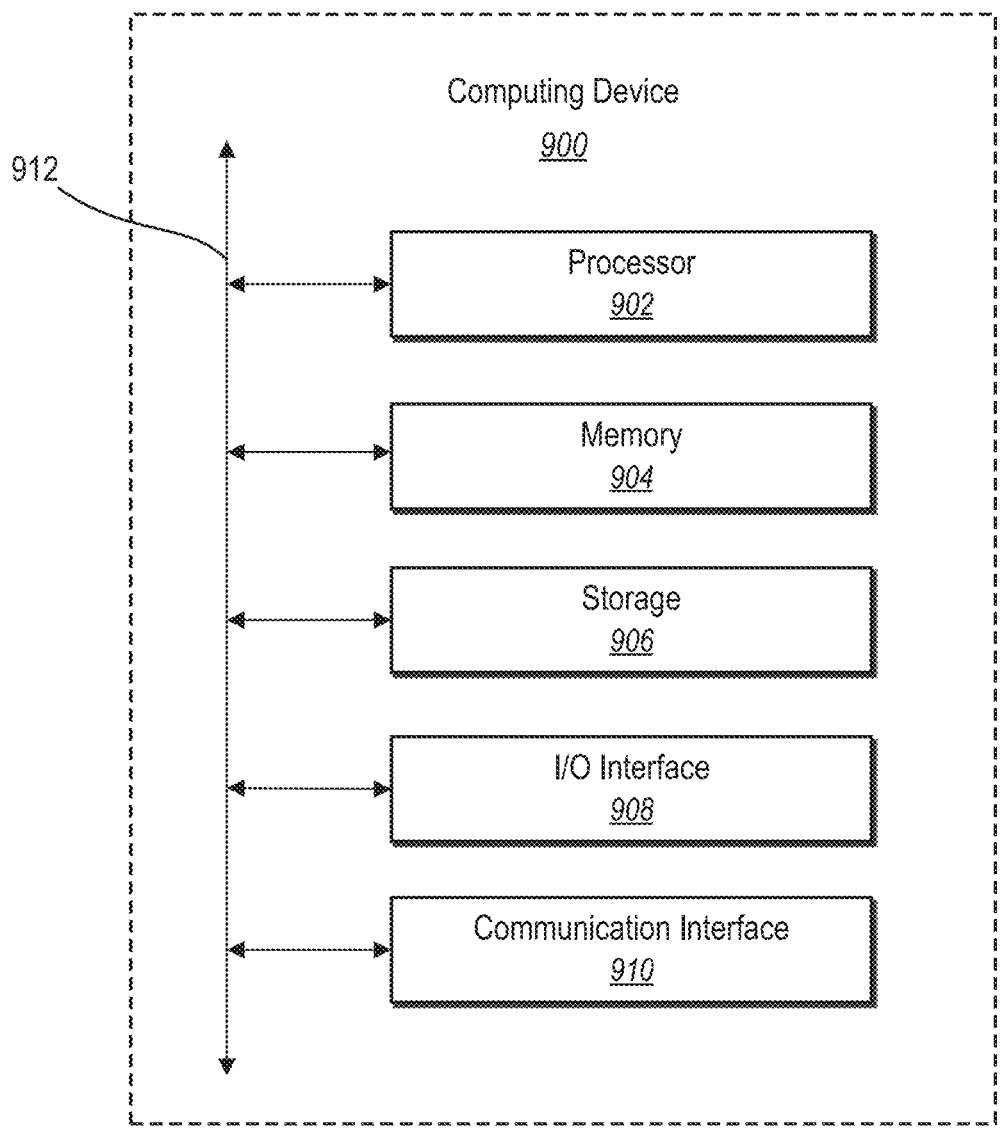
FIG. 9 illustrates a block diagram of an example computing device for implementing one or more embodiments of the present disclosure.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102, the requester client devices 116a-116n, or the computing devices of the autonomous vehicles 108a-108n). In one or more embodiments, the computing device 900 may be a mobile device (e.g., a mobile telephone, a smartphone, a PDA, a tablet, a laptop, a camera, a tracker, a watch, a wearable device, etc.). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes the memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes the storage device 906 for storing data or instructions. As an example, and not by way of limitation, the storage device 906 can include a non-transitory storage medium described above. The storage device 906 may include a hard disk drive ("HDD"), flash memory, a Universal Serial Bus ("USB") drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known I/O devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller ("NIC") or network adapter for communicating with an Ethernet or other wire-based network or a wireless NIC ("WNIC") or wireless adapter for communicating with a wireless network, such as a WI-FI. The computing device 900 can further include the bus 912. The bus 912 can include hardware, software, or both that connects components of computing device 900 to each other.

Figure 10:
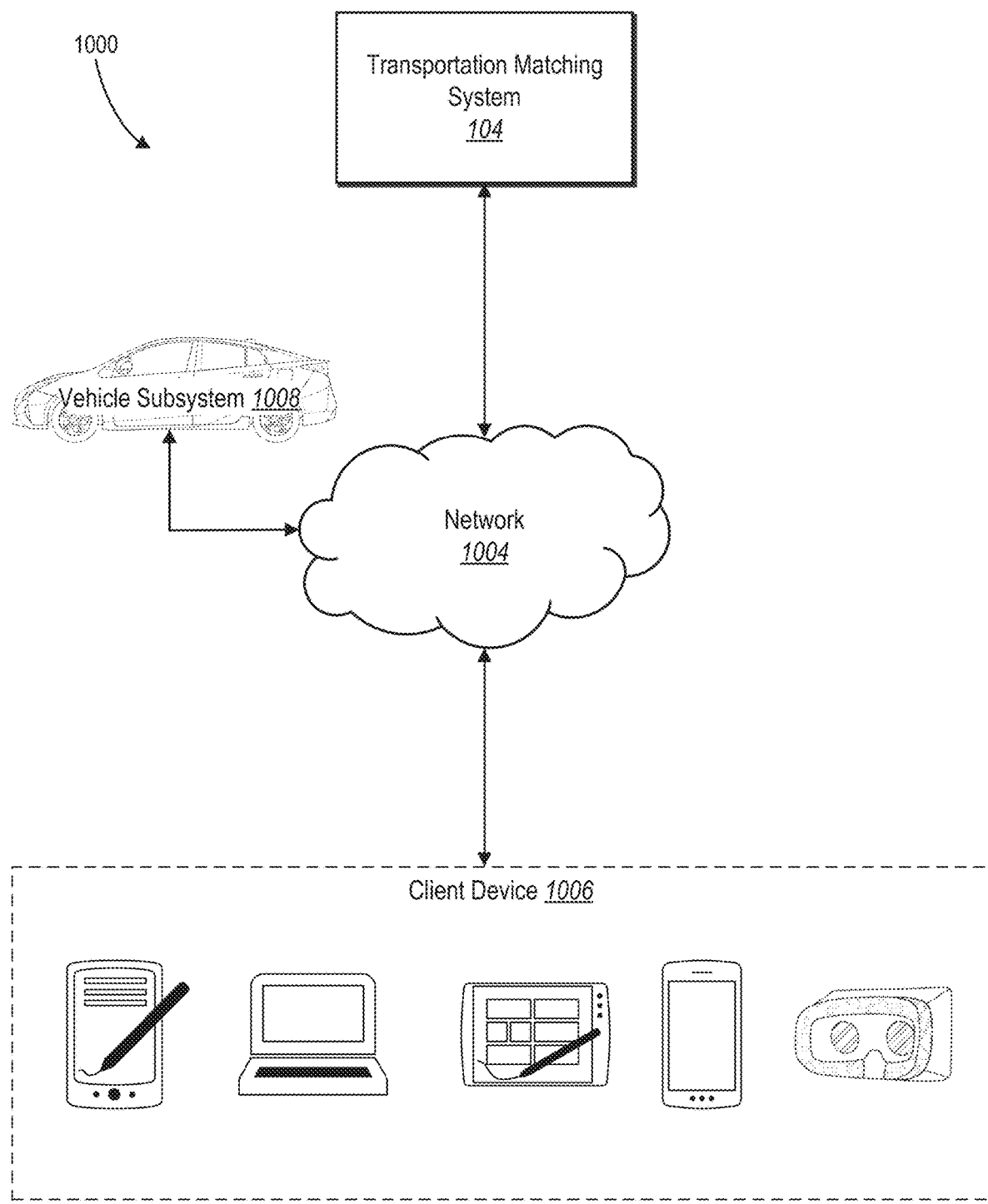
FIG. 10 illustrates an example network environment of a transportation matching system in accordance with one or more embodiments.

FIG. 10 illustrates an example network environment 1000 of a transportation matching system (e.g., the transportation matching system 104). The network environment 1000 includes a client device 1006, a transportation matching system 104, and a vehicle subsystem 1008 connected to each other by a network 1004. Although FIG. 10 illustrates a particular arrangement of the client device 1006, the transportation matching system 104, the vehicle subsystem 1008, and the network 1004, this disclosure contemplates any suitable arrangement of the client device 1006, the transportation matching system 104, the vehicle subsystem 1008, and the network 1004. As an example, and not by way of limitation, two or more of the client device 1006, the transportation matching system 104, and the vehicle subsystem 1008 communicate directly, bypassing the network 1004. As another example, two or more of the client device 1006, the transportation matching system 104, and the vehicle subsystem 1008 may be physically or logically co-located with each other in whole or in part. Moreover, although FIG. 10 illustrates a particular number of the client devices 1006, the transportation matching systems 104, the vehicle subsystems 1008, and the networks 1004, this disclosure contemplates any suitable number of the client devices 1006, the transportation matching systems 104, the vehicle subsystems 1008, and the networks 1004. As an example, and not by way of limitation, the network environment 1000 may include multiple client devices 1006, multiple transportation matching systems 104, multiple vehicle subsystems 1008, and multiple networks 1004.

This disclosure contemplates any suitable network 1004. As an example, and not by way of limitation, one or more portions of the network 1004 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 1004 may include one or more networks 1004.

Links may connect the client device 1006, the transportation matching system 104, and the vehicle subsystem 1008 to the network 1004 or to each other. This disclosure contemplates any suitable links. In particular embodiments, one or more links include one or more wireline (such as, for example, Digital Subscriber Line ("DSL") or Data Over Cable Service Interface Specification ("DOCSIS")), wireless (such as, for example, Wi-Fi or Worldwide Interoperability for Microwave Access ("WiMAX")), or optical (such as, for example, Synchronous Optical Network ("SONET") or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 1000. One or more first links may differ in one or more respects from one or more second links.

In particular embodiments, the client device 1006 may be an electronic device including hardware, software, or embedded logic components or a combination of two or more such components and capable of carrying out the appropriate functionalities implemented or supported by the client device 1006. As an example, and not by way of limitation, a client device 1006 may include any of the computing devices discussed above in relation to FIG. 9. A client device 1006 may enable a network user at the client device 1006 to access a network. A client device 1006 may enable its user to communicate with other users at other client devices 1006.

In particular embodiments, the client device 1006 may include a transportation service application or a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at the client device 1006 may enter a Uniform Resource Locator ("URL") or other address directing the web browser to a particular server (such as the server(s) 102), and the web browser may generate a Hyper Text Transfer Protocol ("HTTP") request and communicate the HTTP request to the server. The server may accept the HTTP request and communicate to the client device 1006 one or more Hyper Text Markup Language ("HTML") files responsive to the HTTP request. The client device 1006 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 104 may be a network-addressable computing system that can host a ride share transportation network. The transportation matching system 104 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 104. In addition, the transportation service system may manage identities of service requesters such as users/requesters. In particular, the transportation service system may maintain requester data such as driving/riding histories, personal data, or other user data in addition to navigation and/or traffic management services or other location services (e.g., GPS services).

In particular embodiments, the transportation matching system 104 may manage ride matching services to connect a user/requester with a vehicle and/or provider. By managing the ride matching services, the transportation matching system 104 can manage the distribution and allocation of vehicle subsystem resources and user resources such as GPS location and availability indicators, as described herein.

The transportation matching system 104 may be accessed by the other components of the network environment 1000 either directly or via network 1004. In particular embodiments, the transportation matching system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable the client device 1006 or the transportation matching system 104 to manage, retrieve, modify, add, or delete, the information stored in data storage.

In particular embodiments, the transportation matching system 104 may provide users with the ability to take actions on various types of items or objects, supported by the transportation matching system 104. As an example, and not by way of limitation, the items and objects may include ride share networks to which users of the transportation matching system 104 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 104 or by an external system of a third-party system, which is separate from the transportation matching system 104 and coupled to the transportation matching system 104 via the network 1004.

In particular embodiments, the transportation matching system 104 may be capable of linking a variety of entities. As an example, and not by way of limitation, the transportation matching system 104 may enable users to interact with each other or other entities, or to allow users to interact with these entities through an application programming interfaces ("API") or other communication channels.

In particular embodiments, the transportation matching system 104 may include a variety of servers, sub-systems, programs, modules, logs, and data stores. In particular embodiments, the transportation matching system 104 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 104 may also include suitable components such as network interfaces, security mechanisms, load balancers, failover servers, management-and-network-operations consoles, other suitable components, or any suitable combination thereof. In particular embodiments, the transportation matching system 104 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 104 and one or more client devices 1006. An action logger may be used to receive communications from a web server about a user's actions on or off the transportation matching system 104. In conjunction with the action log, a third-party-content-object log may be maintained of user exposures to third-partycontent objects. A notification controller may provide information regarding content objects to the client device 1006. Information may be pushed to the client device 1006 as notifications, or information may be pulled from the client device 1006 responsive to a request received from the client device 1006. Authorization servers may be used to enforce one or more privacy settings of the users of the transportation matching system 104. A privacy setting of a user determines how particular information associated with a user can be shared. The authorization server may allow users to opt in to or opt out of having their actions logged by the transportation matching system 104 or shared with other systems, such as, for example, by setting appropriate privacy settings. Third-party-content-object stores may be used to store content objects received from third parties. Location stores may be used for storing location information received from the client devices 1006 associated with users.

In addition, the vehicle subsystem 1008 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 1008 can include an autonomous vehicle—e.g., a vehicle that does not require a human operator. In these embodiments, the vehicle subsystem 1008 can perform maneuvers, communicate, and otherwise function without the aid of a human provider, in accordance with available technology.

In particular embodiments, the vehicle subsystem 1008 may include one or more sensors incorporated therein or associated thereto. For example, sensor(s) can be mounted on the top of the vehicle subsystem 1008 or else can be located within the interior of the vehicle subsystem 1008. In certain embodiments, the sensor(s) can be located in multiple areas at once—i.e., split up throughout the vehicle subsystem 1008 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor suite can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 1008 may include a communication device capable of communicating with the client device 1006 and/or the transportation matching system 104. For example, the vehicle subsystem 1008 can include an on-board computing device communicatively linked to the network 1004 to transmit and receive data such as GPS location information, sensor-related information, requester location information, or other relevant information.

Each of the components of the system can include software, hardware, or both. For example, the components can include one or more instructions stored on a computer-readable storage medium and executable by processors of one or more computing devices, such as a client device or server device. When executed by the one or more processors, the computer-executable instructions of the deep learning attribution system can cause the computing device(s) to perform the methods described herein. Alternatively, the components can include hardware, such as a special purpose processing device to perform a certain function or group of functions. Alternatively, the components of the system can include a combination of computer-executable instructions and hardware.

Furthermore, the components of the system may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for operating a vehicle fleet network system comprising:
   determining locations of autonomous vehicles of a vehicle fleet in a transportation service area subdivided into subregions, wherein the subregions include a subregion having a first set of autonomous vehicle waypoints defining a first autonomous vehicle pre-matching transportation loop within the subregion for the autonomous vehicles to travel prior to receiving transportation matches;
   determining, utilizing a prediction model, one or more predicted requests from requester devices in the subregion;
   determining, utilizing an optimization model for reducing system costs, a second set of autonomous vehicle waypoints for the autonomous vehicles defining a second autonomous vehicle pre-matching transportation loop in the subregion based on the one or more predicted requests from requester devices and the locations of the autonomous vehicles in the transportation service area; and
   transmitting digital prepositioning instructions to one or more autonomous vehicles to cause the one or more autonomous vehicles to travel from a first autonomous vehicle waypoint to a second autonomous vehicle waypoint along the second autonomous vehicle pre-matching transportation loop in the subregion.

2. The computer-implemented method of claim 1, further comprising dividing the transportation service area into the subregions based on at least one of:
- autonomous vehicle accessibility locations and an initial set of one or more predicted requests from autonomous vehicle requester devices in the transportation service area; or
- one or more locations corresponding to one or more predicted requests from autonomous vehicle requester devices in the subregion.

3. The computer-implemented method of claim 1, wherein the one or more autonomous vehicles travel between autonomous vehicle waypoints of the second autonomous vehicle pre-matching transportation loop in the subregion, and the autonomous vehicle waypoints correspond to at least one of a pickup location or a drop-off location and the vehicle fleet network system restricts the one or more autonomous vehicles to traversing one or more roads corresponding to the autonomous vehicle waypoints.

4. The computer-implemented method of claim 1, further comprising determining autonomous vehicle assignments for traversing the second autonomous vehicle pre-matching transportation loop within the subregion by utilizing the optimization model to select subregions for the autonomous vehicles based on a first system cost for failing to respond to the one or more predicted requests from requester devices and a second system cost for modifying locations of the autonomous vehicles.

5. The computer-implemented method of claim 1, further comprising generating subregions in the transportation service area, wherein a size of a subregion within the subregions is based on one or more locations corresponding to one or more predicted requests from autonomous vehicle requester devices in the transportation service area.

6. The computer-implemented method of claim 1, wherein the digital prepositioning instructions direct at least one of the autonomous vehicles to move from a first autonomous vehicle subregion to a second autonomous vehicle subregion in the transportation service area and traverse an autonomous vehicle pre-matching transportation loop within the second autonomous vehicle subregion.

7. The computer-implemented method of claim 1, further comprising:
- generating a first autonomous vehicle pre-matching transportation loop and a second autonomous vehicle pre-matching transportation loop in an autonomous vehicle subregion of the transportation service area;
- transmitting a first set of digital prepositioning instructions to a first autonomous vehicle of the vehicle fleet for directing the first autonomous vehicle to traverse the first autonomous vehicle pre-matching transportation loop, wherein the first autonomous vehicle pre-matching transportation loop is based on a first location of the first autonomous vehicle; and
- transmitting a second set of digital prepositioning instructions to a second autonomous vehicle of the vehicle fleet for directing the second autonomous vehicle to traverse the second autonomous vehicle pre-matching transportation loop, wherein the second autonomous vehicle pre-matching transportation loop is based on a second location of the second autonomous vehicle.

8. The computer-implemented method of claim 7, further comprising transmitting additional instructions to the first autonomous vehicle of the vehicle fleet to traverse the second autonomous vehicle pre-matching transportation loop instead of the first autonomous vehicle pre-matching transportation loop.

9. The computer-implemented method of claim 1, further comprising, in response to determining that an autonomous vehicle is within a threshold radius of an autonomous vehicle waypoint of the second autonomous vehicle pre-matching transportation loop, transmitting modified digital prepositioning instructions directing the autonomous vehicle to travel toward a subsequent autonomous vehicle waypoint defining the second autonomous vehicle pre-matching transportation loop.

10. A non-transitory computer-readable medium storing instructions that, when executed by at least one processor, cause a computer system to:
- determine locations of autonomous vehicles of a vehicle fleet in a transportation service area subdivided into subregions, wherein the subregions include a subregion having a first set of autonomous vehicle waypoints defining a first autonomous vehicle pre-matching transportation loop within the subregion for the autonomous vehicles to travel prior to receiving transportation matches;
- determine, utilizing a prediction model, one or more predicted requests from requester devices in the subregion;
- determine, utilizing an optimization model for reducing system costs, a second set of autonomous vehicle waypoints for the autonomous vehicles defining a second autonomous vehicle pre-matching transportation loop in the subregion based on the one or more predicted requests from requester devices and the locations of the autonomous vehicles in the transportation service area; and
- transmit digital prepositioning instructions to one or more autonomous vehicles to cause the one or more autonomous vehicles to travel from a first autonomous vehicle waypoint to a second autonomous vehicle waypoint along the second autonomous vehicle pre-matching transportation loop in the subregion.

11. The non-transitory computer-readable medium of claim 10, further comprising instructions that, when executed by the at least one processor, cause the computer system to divide the transportation service area into the subregions based on at least one of:
- autonomous vehicle accessibility locations within the transportation service area and an initial set of one or more predicted requests from autonomous vehicle requester devices in the transportation service area; or
- one or more locations corresponding to one or more predicted requests from autonomous vehicle requester devices in the subregion.

12. The non-transitory computer-readable medium of claim 10, further comprising instructions that, when executed by the at least one processor, cause the computer system to determine autonomous vehicle assignments for traversing the second autonomous vehicle pre-matching transportation loop within the subregion by utilizing the optimization model to select subregions for the autonomous vehicles based on a first system cost for failing to respond to the one or more predicted requests from requester devices and a second system cost for modifying locations of the autonomous vehicles.

13. The non-transitory computer-readable medium of claim 10, further comprising instructions that, when executed by the at least one processor, cause the computer system to determine, utilizing an autonomous vehicle prediction model, the one or more predicted requests from requester devices for the subregions based on historical requester device vehicle requests.

14. The non-transitory computer-readable medium of claim 10, further comprising instructions that, when executed by the at least one processor, cause the computer system to, in response to identifying an additional autonomous vehicle in an available state:
- utilize an optimization model to assign the additional autonomous vehicle to a subregion of the subregions;
- determine an autonomous vehicle pre-matching transportation loop within the subregion comprising a plurality of autonomous vehicle waypoints;
- select an autonomous vehicle waypoint of the plurality of autonomous vehicle waypoints based on a location of the additional autonomous vehicle; and
- transmit additional prepositioning instructions to the additional autonomous vehicle to travel to the autonomous vehicle waypoint.

15. A system comprising:
- at least one processor; and
- at least one non-transitory computer-readable storage medium storing instructions that, when executed by the at least one processor, cause the system to:
  - determine locations of autonomous vehicles of a vehicle fleet in a transportation service area subdivided into subregions, wherein the subregions include a subregion having a first set of autonomous vehicle waypoints defining a first autonomous vehicle pre-matching transportation loop within the subregion for the autonomous vehicles to travel prior to receiving transportation matches;
  - determine, utilizing a prediction model, one or more predicted requests from autonomous vehicle requester devices in the subregion;
  - determine, utilizing an optimization model for reducing system costs, a second autonomous vehicle waypoints for the autonomous vehicles defining a second autonomous vehicle pre-matching transportation loop in the subregion based on the one or more predicted requests from autonomous vehicle requester devices and the locations of the autonomous vehicles in the transportation service area; and
  - transmit digital prepositioning instructions to one or more autonomous vehicles to cause the one or more autonomous vehicles to travel from a first autonomous vehicle waypoint to a second autonomous vehicle waypoint along the second autonomous vehicle pre-matching transportation loop in the subregion.

16. The system of claim 15, further comprising instructions that, when executed by the at least one processor, cause the system to select an autonomous vehicle waypoint for at least one autonomous vehicle of the autonomous vehicles to travel toward based on distances between the at least one autonomous vehicle and autonomous vehicle waypoints within a subregion.

17. The system of claim 15, further comprising instructions that, when executed by the at least one processor, cause the system to:
- generate a match between a requester device and an autonomous vehicle; and
- provide transportation instructions to the autonomous vehicle to deviate from an autonomous vehicle pre-matching transportation loop to a location corresponding to the requester device.

18. The system of claim 15, further comprising instructions that, when executed by the at least one processor, cause the system to direct at least one of the autonomous vehicles to move from a first autonomous vehicle subregion to a second autonomous vehicle subregion in the transportation service area and traverse an autonomous vehicle pre-matching transportation loop within the second autonomous vehicle subregion.

19. The system of claim 15, further comprising instructions that, when executed by the at least one processor, cause the system to:
- generate a first autonomous vehicle pre-matching transportation loop and a second autonomous vehicle pre-matching transportation loop in an autonomous vehicle subregion of the transportation service area;
- transmit a first set of digital prepositioning instructions to a first autonomous vehicle of the vehicle fleet for directing the first autonomous vehicle to traverse the first autonomous vehicle pre-matching transportation loop, wherein the first autonomous vehicle pre-matching transportation loop is based on a first location of the first autonomous vehicle; and
- transmit a second set of digital prepositioning instructions to a second autonomous vehicle of the vehicle fleet for directing the second autonomous vehicle to traverse the second autonomous vehicle pre-matching transportation loop, wherein the second autonomous vehicle pre-matching transportation loop is based on a second location of the second autonomous vehicle.

20. The system of claim 19, further comprising instructions that, when executed by the at least one processor, cause the system to transmit additional instructions to the first autonomous vehicle of the vehicle fleet to traverse the second autonomous vehicle pre-matching transportation loop instead of the first autonomous vehicle pre-matching transportation loop.

\* \* \* \* \*